US008103536B2

(12) United States Patent
Green et al.

(10) Patent No.: US 8,103,536 B2
(45) Date of Patent: *Jan. 24, 2012

(54) UNIFIED MODEL FOR AUTHORING AND EXECUTING FLOW-BASED AND CONSTRAINT-BASED WORKFLOWS

(75) Inventors: David G. Green, Kirkland, WA (US); Bimal K. Mehta, Sammamish, WA (US); Satish R. Thatte, Redmond, WA (US); Dharma K. Shukla, Sammamish, WA (US); Abhay Vinayak Parasnis, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/855,756

(22) Filed: Aug. 13, 2010

(65) Prior Publication Data

US 2010/0306000 A1     Dec. 2, 2010

Related U.S. Application Data

(63) Continuation of application No. 11/046,988, filed on Jan. 31, 2005, now Pat. No. 7,805,324.

(60) Provisional application No. 60/615,542, filed on Oct. 1, 2004.

(51) Int. Cl.
 *G06Q 10/00* (2006.01)
(52) U.S. Cl. .................. 705/7.27; 717/106; 707/790
(58) Field of Classification Search .................. None
See application file for complete search history.

(56) References Cited

U.S. PATENT DOCUMENTS

| 5,301,320 | A |   | 4/1994 | McAtee et al. |
| 5,634,127 | A |   | 5/1997 | Cloud et al. |
| 5,734,837 | A |   | 3/1998 | Flores et al. |
| 5,774,661 | A |   | 6/1998 | Chatterjee et al. |
| 5,870,545 | A |   | 2/1999 | Davis et al. |
| 5,930,512 | A |   | 7/1999 | Boden et al. |
| 5,960,404 | A |   | 9/1999 | Chaar et al. |
| 6,016,394 | A |   | 1/2000 | Walker |
| 6,028,997 | A |   | 2/2000 | Leymann et al. |
| 6,065,009 | A |   | 5/2000 | Leymann et al. |
| 6,073,109 | A |   | 6/2000 | Flores et al. |
| 6,078,982 | A |   | 6/2000 | Du et al. |
| 6,115,646 | A | * | 9/2000 | Fiszman et al. ............... 700/181 |
| 6,225,998 | B1 |  | 5/2001 | Okita et al. |

(Continued)

FOREIGN PATENT DOCUMENTS

DE    102 15 653  A1    11/2003

(Continued)

OTHER PUBLICATIONS

Riemer, Jeffrey R., "The Airforce Assistance Center" DISAM Journal, vol. 26, No. 4, 1, Summer 2004.*

(Continued)

*Primary Examiner* — Lynda Jasmin
*Assistant Examiner* — Gurkanwaljit Singh
(74) *Attorney, Agent, or Firm* — Senniger Powers LLP

(57) ABSTRACT

Designing and executing a workflow having flow-based and constraint-based regions. A user selects one or more activities to be part of a constraint-based region. Each constraint-based region has a constraint associated therewith. The workflow is executed by executing the flow-based region and the constraint-based region. The flow-based region executes sequentially. The constraint is evaluated, and the constraint-based region executes responsive to the evaluated constraint.

17 Claims, 10 Drawing Sheets

U.S. PATENT DOCUMENTS

| | | | |
|---|---|---|---|
| 6,253,369 B1* | 6/2001 | Cloud et al. | 717/136 |
| 6,397,192 B1* | 5/2002 | Notani et al. | 705/9 |
| 6,405,364 B1 | 6/2002 | Bowman-Amuah | |
| 6,421,700 B1* | 7/2002 | Holmes et al. | 718/100 |
| 6,567,783 B1 | 5/2003 | Notani et al. | |
| 6,604,104 B1 | 8/2003 | Smith | |
| 6,621,505 B1 | 9/2003 | Beauchamp et al. | |
| 6,625,602 B1 | 9/2003 | Meredith et al. | |
| 6,678,882 B1 | 1/2004 | Hurley et al. | |
| 6,768,986 B2 | 7/2004 | Cras et al. | |
| 6,807,583 B2 | 10/2004 | Hrischuk et al. | |
| 6,845,507 B2 | 1/2005 | Kenton | |
| 6,898,604 B1 | 5/2005 | Ballinger et al. | |
| 6,954,747 B1 | 10/2005 | Wang et al. | |
| 6,964,034 B1 | 11/2005 | Snow | |
| 6,985,939 B2 | 1/2006 | Fletcher et al. | |
| 7,069,536 B2 | 6/2006 | Yaung | |
| 7,089,287 B2* | 8/2006 | Bellotti et al. | 709/206 |
| 7,093,207 B1 | 8/2006 | Liao et al. | |
| 7,096,454 B2 | 8/2006 | Damm et al. | |
| 7,127,716 B2 | 10/2006 | Jin et al. | |
| 7,133,833 B1 | 11/2006 | Chone et al. | |
| 7,181,440 B2 | 2/2007 | Cras et al. | |
| 7,222,334 B2 | 5/2007 | Casati et al. | |
| 7,240,324 B2 | 7/2007 | Casati et al. | |
| 7,272,816 B2 | 9/2007 | Schulz et al. | |
| 7,343,364 B2* | 3/2008 | Bram et al. | 706/47 |
| 7,403,948 B2* | 7/2008 | Ghoneimy et al. | 1/1 |
| 7,408,658 B2 | 8/2008 | Twede | |
| 7,451,432 B2 | 11/2008 | Shukla et al. | |
| 7,464,366 B2 | 12/2008 | Shukla et al. | |
| 2001/0039594 A1* | 11/2001 | Park et al. | 709/311 |
| 2002/0032692 A1* | 3/2002 | Suzuki et al. | 707/200 |
| 2002/0035606 A1 | 3/2002 | Kenton | |
| 2002/0040312 A1 | 4/2002 | Dhar et al. | |
| 2002/0065701 A1 | 5/2002 | Kim et al. | |
| 2002/0147606 A1 | 10/2002 | Hoffmann et al. | |
| 2002/0161859 A1 | 10/2002 | Willcox et al. | |
| 2002/0170035 A1 | 11/2002 | Casati et al. | |
| 2002/0184610 A1 | 12/2002 | Chong et al. | |
| 2002/0188644 A1 | 12/2002 | Seidman | |
| 2003/0004771 A1 | 1/2003 | Yaung | |
| 2003/0018508 A1 | 1/2003 | Schwanke | |
| 2003/0018512 A1* | 1/2003 | Dortmans | 705/9 |
| 2003/0055668 A1 | 3/2003 | Saran et al. | |
| 2003/0084016 A1 | 5/2003 | Norgaard et al. | |
| 2003/0135659 A1* | 7/2003 | Bellotti et al. | 709/313 |
| 2003/0144891 A1 | 7/2003 | Leymann et al. | |
| 2003/0177046 A1 | 9/2003 | Socha-Leialoha | |
| 2003/0195762 A1 | 10/2003 | Gleason et al. | |
| 2003/0200527 A1 | 10/2003 | Lynn et al. | |
| 2003/0217053 A1 | 11/2003 | Bachman et al. | |
| 2003/0220707 A1 | 11/2003 | Budinger et al. | |
| 2003/0233374 A1 | 12/2003 | Spinola et al. | |
| 2004/0044987 A1 | 3/2004 | Kompalli et al. | |
| 2004/0078105 A1* | 4/2004 | Moon et al. | 700/100 |
| 2004/0078373 A1* | 4/2004 | Ghoneimy et al. | 707/10 |
| 2004/0078778 A1 | 4/2004 | Leymann et al. | |
| 2004/0122701 A1* | 6/2004 | Dahlin et al. | 705/2 |
| 2004/0133457 A1 | 7/2004 | Sadiq et al. | |
| 2004/0139426 A1 | 7/2004 | Wu | |
| 2004/0148213 A1 | 7/2004 | Aziz et al. | |
| 2004/0148214 A1 | 7/2004 | Aziz et al. | |
| 2004/0153350 A1 | 8/2004 | Kim et al. | |
| 2004/0162741 A1 | 8/2004 | Flaxer et al. | |
| 2004/0168155 A1 | 8/2004 | O'Farrell et al. | |
| 2004/0221261 A1 | 11/2004 | Blevins | |
| 2005/0027585 A1* | 2/2005 | Wodtke et al. | 705/9 |
| 2005/0034098 A1 | 2/2005 | DeSchryver et al. | |
| 2005/0050311 A1 | 3/2005 | Joseph et al. | |
| 2005/0066002 A1 | 3/2005 | Teres et al. | |
| 2005/0066287 A1 | 3/2005 | Tattrie et al. | |
| 2005/0071209 A1 | 3/2005 | Tatavu et al. | |
| 2005/0149908 A1 | 7/2005 | Klianev | |
| 2005/0177820 A1 | 8/2005 | Mei et al. | |
| 2005/0182773 A1* | 8/2005 | Feinsmith | 707/100 |
| 2005/0192963 A1 | 9/2005 | Tschiegg et al. | |
| 2005/0193286 A1 | 9/2005 | Thatte et al. | |
| 2005/0204333 A1 | 9/2005 | Denby et al. | |
| 2005/0267889 A1 | 12/2005 | Snyder et al. | |
| 2006/0059253 A1 | 3/2006 | Goodman et al. | |
| 2006/0064335 A1 | 3/2006 | Goldszmidt et al. | |
| 2006/0074734 A1 | 4/2006 | Shukla et al. | |
| 2006/0074736 A1 | 4/2006 | Shukla et al. | |
| 2006/0112122 A1 | 5/2006 | Goldszmidt et al. | |
| 2006/0143193 A1 | 6/2006 | Thakkar et al. | |
| 2006/0206863 A1 | 9/2006 | Shenfield et al. | |
| 2006/0225032 A1 | 10/2006 | Klerk et al. | |
| 2006/0236304 A1 | 10/2006 | Luo et al. | |
| 2006/0241954 A1 | 10/2006 | Jeng et al. | |
| 2006/0271927 A1 | 11/2006 | Morales et al. | |
| 2008/0178146 A1* | 7/2008 | Koehler et al. | 717/106 |
| 2008/0320486 A1 | 12/2008 | Bose et al. | |

FOREIGN PATENT DOCUMENTS

| | | |
|---|---|---|
| EP | 0 697 652 A1 | 2/1996 |
| EP | 0 953 929 A2 | 11/1999 |
| GB | 2 263 988 A | 8/1993 |
| JP | 08-101817 | 4/1996 |
| JP | 09-204467 | 8/1997 |
| JP | 11-296544 | 10/1999 |
| JP | 11-316780 | 11/1999 |
| JP | 2000-348111 | 12/2000 |
| JP | 2001-202408 | 7/2001 |
| JP | 2001-282970 | 10/2001 |
| JP | 2003-528358 | 9/2003 |
| JP | 2004-164594 | 6/2004 |
| JP | 2004-206694 | 7/2004 |
| WO | 00/54202 A2 | 9/2000 |
| WO | 2005/033933 A1 | 4/2005 |

OTHER PUBLICATIONS

Paul A Sharman, & Kurt Vikas. (2004). Lessons from German. Strategic Finance, 86(6), 28-35.*

Matthew Lambert III. (2004). Improvement and Innovation in Hospital Operations: A Key to Organizational Health. Frontiers of Health Services Management, 20(4), 39-45.*

Liu, Ling; Pu, Calton; Ruiz, Duncan Dubugras, "A systematic approach to flexible specification, composition, and restructuring of workflow activities" Journal of Database Management vol. 15. No. 1, pp: 1-40, Jan.-Mar. 2004.*

Etzel, Barbara, "B-to-B exchanges: Marriage before a 2nd birthday?" Investment Dealers' Digest: IDD pp: 18 (Nov. 6, 2000).*

David L Zwang. (Jul. 2000). Digital workflows. American Printer, 225(4), 52-56.*

David L Zwang. (Aug. 2001). Workflow and the Internet. American Printer, 227(5), 18-22.*

Virdell, "Business Processes and Workflow in the Web Services World," printed from http://www-106.ibm.com/developerworks/webservices/library/ws-work.html, IBM Corporation, Jan. 1, 2003, 6 pages, U.S.

Boiko, "Everyone talks About Workflow, But What Is It, Really?" printed from http://www.cmswatch.com/Features/TopicWatch/FeaturedTopic/?feature_id=47, CMSWorks, Inc., Oct. 4, 2001, 5 pages, U.S.

Adkins, "Introduction to Workflow Learning," printed from http://www.internettime.com/workflow/intro_wfl.htm, Workflow Learning Institute, Internet Time Group LLC, Nov. 2003, 11 pages, U.S.

Parasnis, "Session Code: DAT321—Data Systems—BizTalk Orchestration Engine Futures," Microsoft Professional Developers Conference 2003, Oct. 27, 2003, 13 pages, Microsoft Corporation, U.S.A.

Marshak, "IBM's Flowmark Object-Oriented Workflow for Mission-Critical Applications," Workgroup Computing Report, vol. 17, No. 5, May 1, 1994, IBM Corporation, pp. 3-13.

Maurer et al., "Merging Project planning and Web-Enabled Dynamic Workflow Technologies," IEEE Internet Computing, Jun. 2000, pp. 65-74, IEEE Service Center U.S.A.

Brambilla, M. et al., "Exception Handling within Workflow-based Web Applications," Web Engineering, 4th International Conference, Munich: LNCS Springer, 2004, 14 pgs., http://www.webml.org/webml/upload/ent5/1/213_brambilla_icwe2004.pdf.

Hagen, C. et al., "Exception Handling in Workflow Management Systems," IEEE Transactions on Software Engineering, Oct. 2000, vol. 26, No. 10, pp. 943-958.

Perkins, A., "Business Rules = Meta-Data," Proceedings of the Technology of Object-Oriented Languages and Systems (TOOLS 34'00), 2000, pp. 285-294.

Zhao, Z. et al., "Dynamic Workflow in a Grid Enabled Problem Solving Environment," Proceeding of 5th International Conference on Computer and Information Technology, IEEE 2005, 7 pgs.

Goff et al., "Object Serialization and Decimalization using XML," Apr. 2001, CERN, Switzerland, pp. 1-14.

ISO/IEC, "Document Schema Definition Languages (DSDL)—Part 4: Namespace-based Validation Dispatching Language—NVDL," May 2004, available at http://dsdl.org, pp. i-vi, 1-45.

Blake,"Coordinating Multiple Agents for Workflow-oriented Process Orchestration," Springer-Verlag, 2003, pp. 387-404.

Akhil Kumar, & J Leon Zhao. (1999). Dynamic routing and operational controls in workflow management systems. Management Science, 45(2), 253-272. Retrieved Sep. 25, 2009, from ABIIINFORM Global. (Document ID: 40467174).

Amit Basu, & Akhil Kumar. (2002). Research commentary: Workflow management issues in e-business. Information Systems Research, 13(1), 1-14. Retrieved Sep. 25, 2009, from ABI/INFORM Global.

Workflow Automation: Overview and Research Issues Edward A. Stohr; J. Leon Zhao Information Systems Frontiers; Sep. 2001; 3, 3; ABI/INFORM Global p. 281.

KWM: Knowledge-based Workflow Model for Agile Organization Ha Bin Lee; Jong Woo Kim; Sung Joo Park Journal of Intelligent Information Systems; Nov.lDec. 1999; 13, 3; ABI/INFORM Global p. 261.

Blumenthal, Richard Louis (1998). Supporting unstructured activities with a meta-contextual protocol in situation-based workflow. Ph.D. dissertation, University of Colorado at Boulder, United States—Colorado. Retrieved Sep. 25, 2009, from Dissertations & Theses: Full Text.

Kuczun et al., "Network Design: Tasks & Tools", in proceedings of the conference on Designing interactive systems, 1997, pp. 215-222.

Helm, R., "Realizing a Human Workflow with BizTalk 2004," Directions on Microsoft, vol. 1, No. 5, pp. 32-43, Media Select Co., Ltd., Aug. 16, 2004 (Publication Date).

Fahringer et al., "A-GWL: Abstract Grid Workflow Language", May 12, 2004; Computational Science—ICCS 2004; [Lecture Notes in Computer Science; LNCS]; Springer-Verlag, Berlin/Heidelberg, 9 pgs.

\* cited by examiner

UNIFIED MODEL FOR AUTHORING AND EXECUTING FLOW-BASED AND CONSTRAINT-BASED WORKFLOWS

CROSS-REFERENCE TO RELATED APPLICATION

This application is a continuation of U.S. application Ser. No. 11/046,988 filed Jan. 31, 2005, which claims the benefit of U.S. Provisional Patent Application No. 60/615,542 filed Oct. 1, 2004, both of which are herein incorporated by reference in their entirety.

TECHNICAL FIELD

Embodiments of the present invention relate to the field of workflow modeling. In particular, embodiments of this invention relate to a componentized and extensible workflow model.

BACKGROUND

Existing systems attempt to map business problems to high-level workflows by modeling the business problem. However, real world workflows vary in a variety of dimensions such as (a) execution and modeling complexity, (b) knowledge of the structure of the flow at design time, (c) statically defined or ad-hoc/dynamic, (d) ease of authoring and editing the flow at various points in its lifecycle, and (e) weak or strong association of business logic with the core workflow process. Existing models fail to accommodate all these factors.

Further, most existing workflow models are based on either language-based approaches (e.g., BPEL4WS, XLANG/S, and WSFL) or application based approaches. Language based approaches are high-level workflow languages with a closed set of pre-defined constructs help model the workflow process to the user/programmer. The workflow languages carry all of the semantic information for the closed set of constructs to enable the user to build a workflow model. However, the languages are not extensible by the developers and represent a closed set of primitives that constitute the workflow model. The languages are tied to the language compiler shipped by the workflow system vendor. Only the workflow system product vendor may extend the model by extending the language with a new set of constructs in a future version of the product. This often requires upgrading the compiler associated with the language.

Application based approaches are applications which have the workflow capabilities within the application to solve a domain specific problem. These applications are not truly extensible nor do they have a programmable model.

With the existing approaches, the issues of complexity, foreknowledge, dynamic workflows, authoring ease, and strength of associations with business logic and core workflows are not adequately addressed. There are no extensible, customizable, and re-hostable workflow designer frameworks available to build visual workflow designers to model different classes of workflows. Existing systems lack a rapid application development (RAD) style workflow design experience which allows users to graphically design the workflow process and associate the business logic in a programming language of developer's choice. In addition, there are no ink-enabled workflow designers.

In addition, existing systems fail to provide seamless ad-hoc or dynamic editing for executing workflows. Workflow processes are dynamic and mobile in nature and their form cannot be entirely foreseen at design time. The workflow processes start in a structured fashion and eventually evolve and change during the course of their execution lifetime. There is a need for a workflow authoring framework that allows workflow builders to author various types of workflow models at design time as well as make ad-hoc or dynamic changes to running workflows in a seamless manner. Even after a workflow process has been deployed and is running, changes in business requirements often force changing or editing the currently running workflow process. There is a need for a system that provides runtime authoring of a workflow process.

In addition, workflow processes deal with cross cutting orthogonal and tangled concerns that span multiple steps of a workflow process model. For example, while parts of the workflow process are designed to participate in long running transactions, other parts of the same process are designed for concurrent execution. Still other portions of the same workflow process require tracking, while other portions handle business or application level exceptions. There is a need to apply certain behaviors to one or more portions of a workflow process.

Some workflow modeling approaches are impractical as they require a complete flow-based description of an entire business process including all exceptions and human interventions. Some of these approaches provide additional functionality as exceptions arise, while other approaches exclusively employ a constraint-based approach instead of a flow-based approach to modeling a business process. Existing systems implement either the flow-based or constraint-based approach. Such systems are too inflexible to model many common business situations.

Accordingly, a componentized and extensible workflow model is desired to address one or more of these and other disadvantages.

SUMMARY

Embodiments of the invention provide an extensible framework for building a componentized workflow model. In particular, each step of a workflow process has an associated component model that describes design time aspects, compile time aspects, and runtime aspects of the workflow step. Further, any developer may extend the core workflow model by authoring these components. The invention includes a workflow engine that is flexible and powerful enough to coordinate the execution of various kinds of workflows including highly formal machine-to-machine processes, constraint-based ad-hoc human workflows, and workflows having a mixture of flow-based and constraint-based approaches. The workflow engine permits activation, execution, query, and control capabilities against executing workflows. For example, the invention permits ad-hoc and dynamic changes to executing workflows. The workflow engine is rehostable or embeddable in a variety of host environments including both server and client environments. Each specific host environment marries the workflow engine to a set of service providers. The aggregate capabilities of the service providers determine the kinds of workflows that may be executed in the specific host environment.

Other embodiments of the invention provide a declarative format such as an extensible orchestration markup language (XOML) for serializing a workflow model. The declarative format enables a user to extend the workflow model by writing a set of components. The semantics corresponding to the various steps of a workflow process are encapsulated in an activity validator component which validates and enforces the semantics for a given component at compile time. Embodiments of the declarative format of the invention further enable the declaration and association of data with various elements of the workflow model. The declarative format supports the transformation of the data through the workflow. For example, the format represents external data sources such as databases or files, code snippets, and business rules within the workflow model declaratively.

An embodiment of the invention provides an extensible, customizable, and re-hostable workflow designer framework to build graphical/visual workflow designers to model different classes of workflows. Another embodiment of the invention supports a rapid application development style workflow design experience to allow users to graphically design a workflow process and associate business logic in any programming language. Embodiments of the invention also provide ink support using pen and tablet technologies. The invention provides a free form drawing surface in which a workflow drawn by a user is converted into an internal representation. The invention supports creation and modification of the workflows via ink editing on the existing drawing surface (e.g., add/delete activities), and ink annotation of existing workflows (e.g., comments, suggestions, or reminders hand-drawn on the design surface).

Still other embodiments of the invention provide components for capturing cross cutting behaviors in a declarative way and applying the behaviors to selected portions of a workflow model. Other embodiments of the invention execute the selected portions of the workflow model in the context of the behaviors associated therewith. Embodiments of the invention provide a framework, reusable components, and a language to deal with cross cutting orthogonal and tangled concerns that span multiple steps of a workflow process model.

In accordance with one aspect of the invention, a computer-implemented system represents a workflow model. The computer-implemented system includes a workflow having a structured plurality of activities. The workflow further includes an unstructured plurality of activities each having a constraint associated therewith. The system also includes a runtime engine for performing the workflow by executing each of the structured plurality of activities, evaluating the constraint for each of the unstructured plurality of activities, and executing each of the unstructured plurality of activities as a function of evaluating the constraint associated therewith.

In accordance with another aspect of the invention, a method models a workflow. The workflow represents a business process. The method includes presenting a plurality of activities to a user. The method also includes receiving from the user a selection of the presented activities and a flow specification associated therewith. The method also includes grouping the received selection of activities in accordance with the received flow specification. The method also includes receiving from the user another selection of the presented activities and a constraint associated therewith. The method also includes merging the received other selection of the presented activities with the grouped selection of activities to create a workflow.

In accordance with yet another aspect of the invention, one or more computer-readable media have computer-executable components for modeling a workflow having a flow-based region and a constraint-based region. The components include a display component for presenting a plurality of activities to a user. The components also include an interface component for receiving from the user a selection of the presented activities and a flow specification associated therewith. The interface component further receives from the user another selection of the presented activities and a constraint associated each therewith. The component also includes a designer component for grouping the received selection of activities in accordance with the received flow specification. The designer component further merges the received other selection of the presented activities with the grouped selection of activities to create a workflow.

Alternatively, the invention may comprise various other methods and apparatuses.

Other features will be in part apparent and in part pointed out hereinafter.

Figure 1:
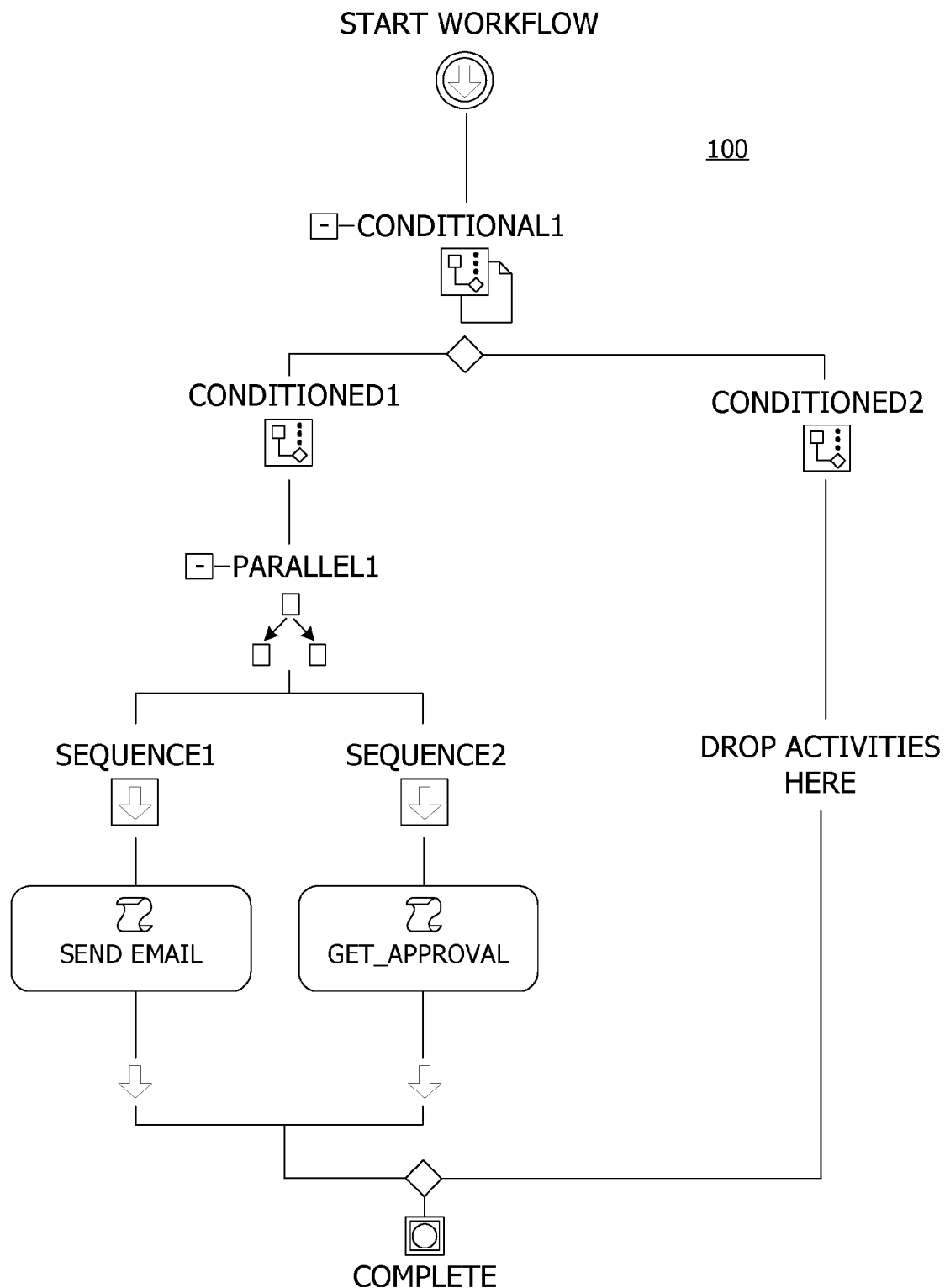
FIG. 1 is an exemplary workflow containing tasks and control flow composite activities.

Appendix A describes exemplary activities.

Corresponding reference characters indicate corresponding parts throughout the drawings.

DETAILED DESCRIPTION

Embodiments of the invention model a workflow representing a process such as a business process. Business processes are dependant and ordered tasks, activities, or the like that result in predictable and repeatable outcomes. Including an organization's operating procedures, institutional working knowledge, and information resources, business processes are designed to satisfy defined business objectives in an efficient and timely manner. In an efficient environment, the functional components of a process can be readily identified, adapted, and deployed to address ever-changing corporate requirements. The workflow is an end user's experience interacting with the tasks in a business process. Tasks are modeled as activities, components, or the like, each representing a unit of work that is performed by a person or machine. In one embodiment, a plurality of activities is presented to a user. The user selects and organizes the activities to create the workflow. The created workflow is executed to model the business process. Referring to FIG. 1, an exemplary workflow 100 contains tasks and control flow composite activities.

In one example, an orchestration engine workflow model supports modeling, authoring and executing different classes of workflows. Examples include modeling a given problem in terms of a structured set of steps that occur in an ordered sequence or as a set of asynchronous events. The orchestration engine coordinates the execution of schedules. A schedule is an organized set of activities that is arranged hierarchically in a tree structure. The execution context of, and the shared data visible to, an executing activity is provided by a scope. Each activity represents a component that encapsulates metadata for the step in a workflow process. The activity is the basic unit of execution in the workflow model and has associated properties, handlers, constraints and events. Each activity may be configured by user code in any programming language. For example, the user code may represent business or application logic or rules written in common language runtime (CLR) languages. Each activity supports pre-interception hooks and post-interception hooks into execution in the user code. Each activity has associated runtime execution semantics and behavior (e.g., state management, transactions, event handling and exception handling). Activities may share state with other activities. Activities may be primitive activities or grouped into a composite activity. A primitive or basic activity has no substructure (e.g., child activities), and thus is a leaf node in a tree structure. A composite activity contains substructure (e.g., it is the parent of one or more child activities).

In one embodiment, activities are of three types: simple activity, container activity and root activity. In this embodiment, there is one root activity in the model, and none or any quantity of simple activities or container activities inside the root activity. A container activity may include simple or container activities. The entire workflow process may be used as an activity to build higher-order workflow processes. Further, an activity may be interruptible or non-interruptible. A non-interruptible composite activity does not include interruptible activities. A non-interruptible activity lacks services that would cause the activity to block.

Figure 2:
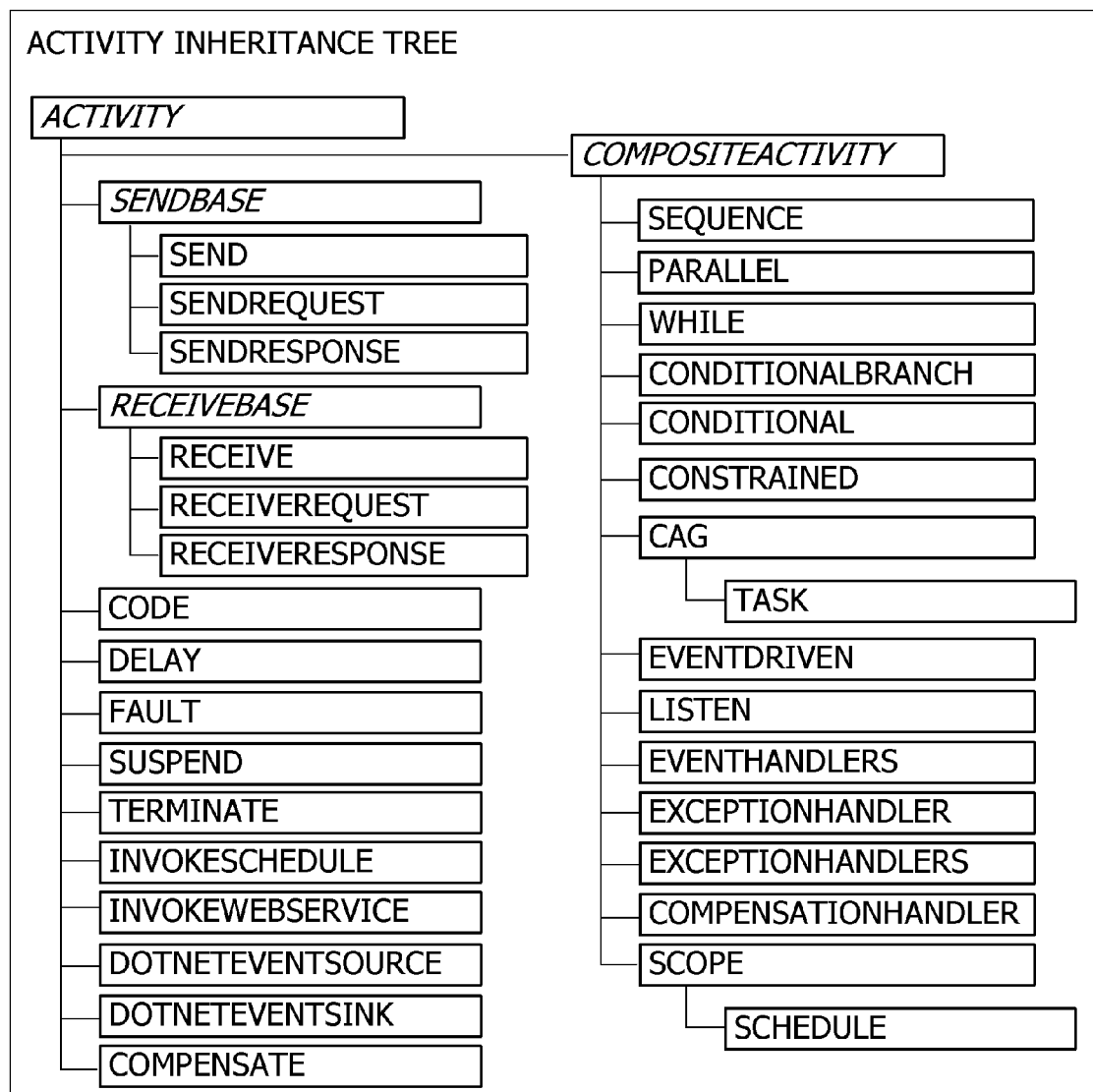
FIG. 2 illustrates an exemplary activity inheritance tree.

The orchestration engine provides an exemplary set of activities. Referring to FIG. 2, an activity inheritance tree illustrates exemplary activities. The exemplary activities listed in FIG. 2 are described in detail in Appendix A. In addition, any user may write one or more activities to extend the workflow model. For example, the user may write activities for a specific business problem, domain, workflow standard (e.g. business process execution language), or a target platform. The orchestration engine may provide a rich set of services to the user for writing activities which include, for example, services of analyzing code, type resolution and type system, services for serialization, and rendering.

In one embodiment, each activity has at least three parts: metadata, instance data, and execution logic. The metadata of the activity defines data properties that may be configured. For example, some activities may share a common set of metadata defined in an activity abstract base class. Each activity declares its own additional metadata properties according to its needs by extending this class.

The values of metadata properties will be shared by all instances of that activity across the instances of the schedule where the activity was configured. For example, if a user creates a schedule A and adds a send activity to it, the send activity is given identification information (e.g., "001") as part of its metadata. A second send activity added to the schedule would receive its own unique identification information (e.g., "002"). Once multiple instances of schedule A are created and executed, all instances of send "001" will share metadata values. In contrast, the instance data of an activity defines a set of data which is specific to the instance of the activity in a running schedule instance. For example, a delay activity may offer a read-only property on its instance data that is the date and time value representing the delay activity's timeout value. This value is available once the delay activity has begun executing, and it is most likely different for every single instance of the delay activity. It is common to refer to instances of schedules, and especially instances of activities and tasks, without qualifying the reference with "instance."

Composite activities have their set of child activities as another element. Child activities are considered metadata in one embodiment. The orchestration engine model explicitly permits manipulation of this metadata at runtime within an instance of the schedule. It is possible to add new child activities to a composite activity that is part of an executing schedule instance such that only the metadata (activity tree) for that schedule instance is affected.

Figure 3:
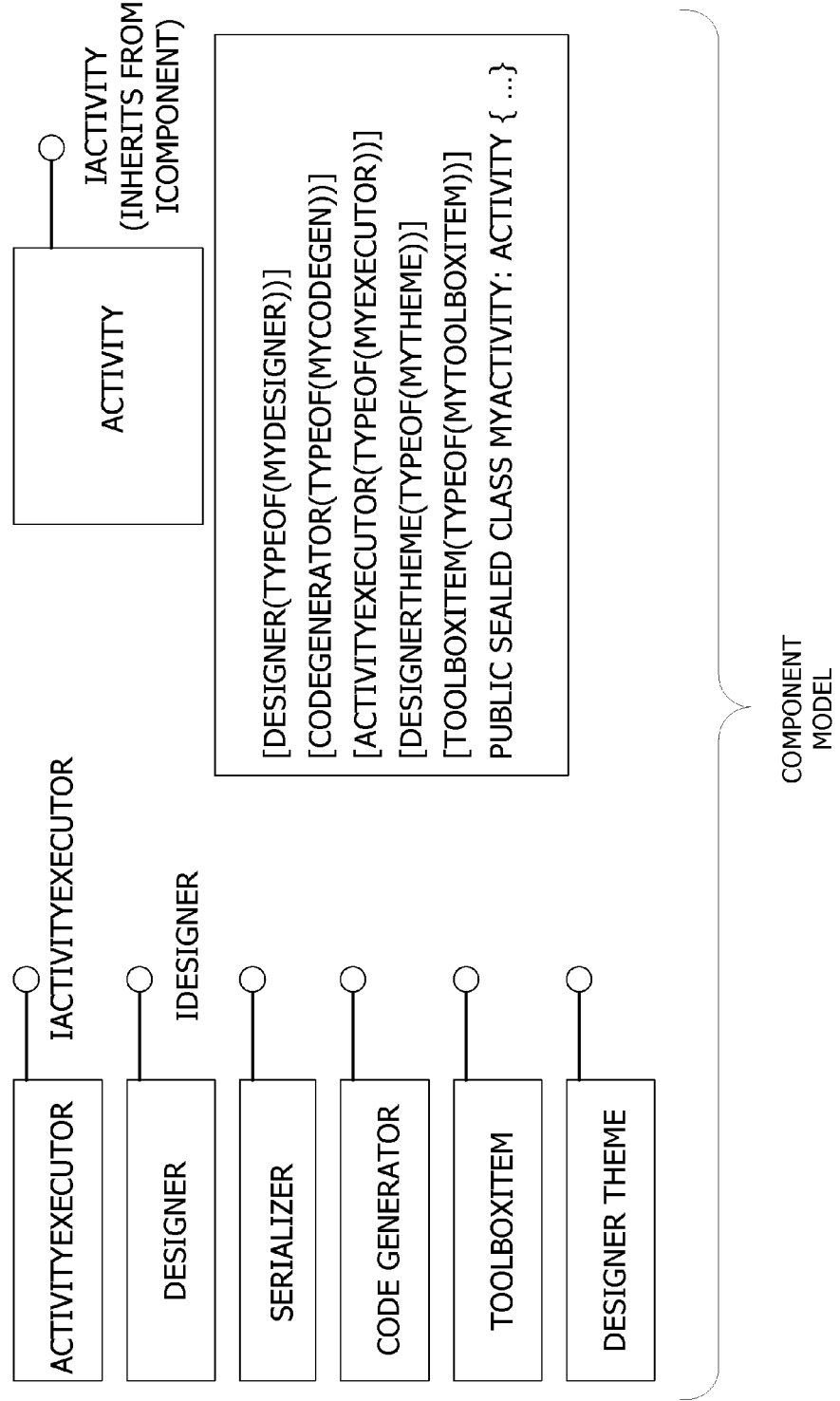
FIG. 3 illustrates an exemplary component model.

Referring next to FIG. 3, each activity has an associated set of components that forms the component model for the activity. The associated set of components includes an activity executor, an activity designer, an activity serializer, an activity validator (e.g., semantic checker), and an activity code generator. The activity executor is a stateless component that implements the execution semantics for the activity. The activity executor works with the metadata of an activity to implement the activity. A core scheduler acts as a service provider for the activity executor to provide services to the activity executor.

The activity designer visually displays the design time visual representation of the activity. The activity designer is a node in a designer hierarchy and may be themed or skinned. The activity designer is hosted in a design environment (e.g., an application program) and interacts with the host design environment via services. The activity validator enforces the activity semantics at compile time as well as runtime. The activity validator operates on the context of the workflow model and uses the services provided by the environment (e.g., compiler, designer, or runtime). Validation occurs at various points in the lifecycle of a workflow. Structural compliance checks are made when creating serialized representations of the workflow, when compiling, and in response to the user's request. The semantic checks may be stronger at runtime than those performed at compile-time to ensure the safety of a runtime operation such as the addition or replacement of an activity in the activity tree of a running instance. The invention evaluates semantics associated with each of the activities for conformance or compliance with, for example, predefined interface requirements.

The activity serializer is a component that serializes the metadata of an activity. The activity serializer is called from the various model/format serializers. The entire workflow model is serialized based on an extensible schema into a declarative markup language which may be further translated into other workflow languages as desired.

In one embodiment, the component model for an activity is stored as a data structure on a computer-readable medium. In the data structure, the activity designer is represented by an image field storing data (e.g., an icon) for visually representing the activity. In addition, one or more author time fields store metadata defining properties, methods, and events associated with the activity. The activity serializer is represented by a serializer field storing data for transferring the metadata stored in the author time fields to a declarative representation of the activity. The activity generator is represented by a business logic field storing software code associated with the metadata stored in the author time fields. The activity executor is represented by an executor field storing data for executing the software code stored in the business logic field.

Scopes and Schedules

The execution context of, and the shared data visible to, an executing activity is provided by a scope. A scope is one of the core activities. A scope is a unifying construct for bringing together variables and the state of a long-running service with transactional semantics, error-handling semantics, compensation, event handlers, and data state management. A scope may have associated exception and event handlers. In one embodiment, a scope may be transactional, atomic, long running, or synchronized. Concurrency control is provided for the user in cases of conflicting read-write or write-write access to user variables. A scope is also a transaction boundary, an exception handling boundary, and a compensation boundary. Since scopes may be nested within a schedule, it is further possible to declare variables, messages, channels, and correlation sets with the same name in different scopes (even if the scopes are nested) without name collision.

Scopes nested within a schedule are only executable within the context of that schedule. A schedule may be compiled either as an application (e.g., a standalone executable entity) or as a library (e.g., for invocation from other schedules). Every schedule that is compiled as a library effectively constitutes a new activity type that may be invoked from within other schedules. A schedule's metadata includes the declaration of parameters.

Once a schedule is developed, instances of the developed schedule may be executed. The process of activating and controlling a schedule instance is a function of the host environment in which the orchestration engine is embedded. The orchestration engine provides a no-frills "simple host" that may be used to test schedules. In addition, the orchestration engine provides an activation service to promote standardization of a "service provider" model (e.g., application programming interfaces) that is used alike by the engine and external applications for interacting with the service environment (i.e. host). The activation service creates a schedule instance of a particular schedule type, optionally passing parameters. The schedule instance is essentially a proxy to the running schedule instance and includes an identifier that uniquely identifies the instance, a reference to the metadata (activity tree) for the schedule, and methods to suspend, resume, and terminate the instance. The activation service also support finding a schedule instance based on a given schedule instance identifier.

Code-Beside

A scope activity may have an associated code-beside class that includes business logic for the scope activity. Since a schedule is itself a scope, a schedule may also have a code-beside class. Any scopes nested within a schedule may also have their own code-beside classes. The activities that are nested within a scope share the scope's code-beside class which acts as a container for their shared data state and business logic. For example, metadata for a code activity includes a reference to a method with a particular signature in the code-beside. In another example, metadata for a send activity includes an optional reference to a code-beside method of a particular signature plus mandatory references to a message declaration and a channel declaration.

Exemplary uses of code-beside include the following: declaration of variables, messages, channels, and correlation sets; declaration of in/out/ref parameters; declaration of additional custom properties; preparation of a message to be sent; processing of a message that has been received; implementation of a rule expressed in code that returns a Boolean value; manipulation of locally defined variables; reading activity metadata and instance data; writing activity instance data (e.g., setting a property on an activity about to be executed); raising an event; throwing an exception; enumerating and navigating the hierarchy of activities in the running schedule instance's activity tree, including across nested scopes and schedule invocation boundaries; adding new activities to a composite activity within the running schedule instance; changing the declarative rules associated with activities within the running schedule instance; and obtaining references to, and manipulating, other running schedule instances.

Figure 4:
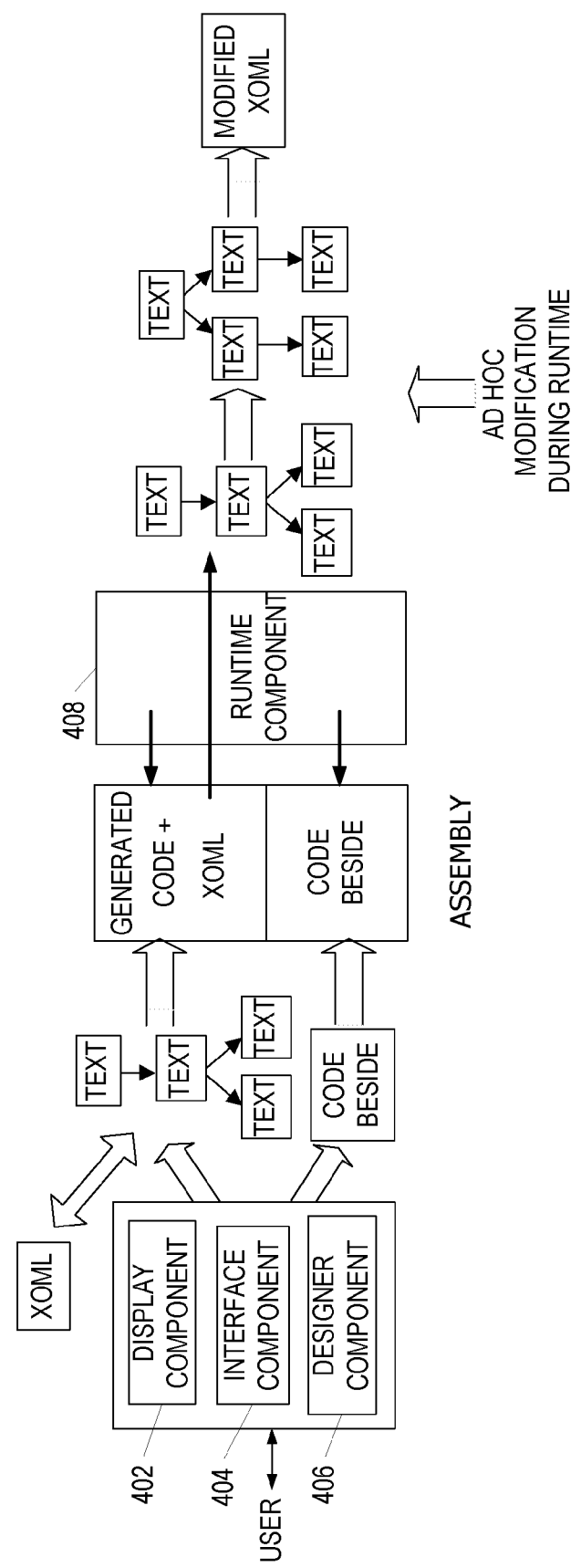
FIG. 4 illustrates an exemplary component model lifecycle.

Referring to FIG. 4, a block diagram illustrates an exemplary component model lifecycle. A user interacts with computer-executable components stored on one or more computer-readable media for modeling a workflow having a flow-based region and a constraint-based region. The computer-executable components include a display component 402, an interface component 404, a designer component 406, and a runtime component 408. The display component 402 presents a plurality of activities to a user. The interface component 404 receiving from the user a selection of the presented activities and a flow specification associated therewith. The designer component 406 groups the received selection of activities in accordance with the received flow specification to create a structured plurality of activities. The interface component 404 further receives from the user another selection of the presented activities and a constraint associated each therewith. This other selection represents an unstructured plurality of activities each having a constraint associated therewith. In one embodiment, the user defines one or more of the constraints. The designer component 406 further merges the structured plurality of activities with the unstructured plurality of activities to create a workflow. The runtime component 408 executes the structured plurality of activities in accordance with the flow specification. The runtime component 408 further executes the created workflow by evaluating the constraint associated with each of the unstructured plurality of activities and executing those activities whose constraint has been satisfied per the evaluation. In one embodiment, the constraint has an input parameter and the runtime engine 408 further performs the workflow by identifying a change in the input parameter and re-evaluating the constraint.

In one embodiment, one or more of the display component 402, interface component 404, designer component 406, and runtime component 408 execute within an execution environment, context, or the like, of an application program.

Hardware, software, and a system such as illustrated in FIG. 4 and described herein constitute exemplary means for presenting to the user the structured plurality of activities and the unstructured plurality of activities; exemplary means for receiving from the user a selection of the structured plurality of activities, a selection of the unstructured plurality of activities, and a flow specification associated with the selected activities; exemplary means for grouping the selection of the structured plurality of activities and the selection of the unstructured plurality of activities in accordance with the flow specification to create the workflow; and exemplary means for executing the created workflow.

One or more computer-readable media have computer-executable instructions for performing the method.

Constrained Activity Groups

Workflows come in many shapes and sizes and each may be characterized by where it sits on a spectrum ranging from ad-hoc at one end to formal at the other. In general, an ad-hoc workflow has a set of tasks to be performed or executed in any order. That is, the set of tasks are independent with respect to execution order. A formal workflow has well-defined control flow constructs (e.g., sequencing, concurrency, conditional branching, and while loops) used to precisely define and control the execution of the set of tasks. Some workflows have parts which are formal and other parts which are ad-hoc and most easily expressed as having goals and constraints. In some cases, workflows may even migrate along this spectrum during their lifetime or have their flow and/or constraints change while instances are in-flight.

The invention provides the unification of flow-based scheduling and constraint-based scheduling. This synthesis centers around a control flow construct called constrained activity group (CAG). The CAG activity provides a grouping of activities whose course of execution is guided by constraints associated with the contained activities. In this way, CAG facilitates goal oriented constrained execution of a set of activities (e.g., related activities) in which paths of execution are not explicitly modeled. The degenerate case of CAG (e.g., in which no constraints are specified on any of the contained activities and the default completion condition is utilized) is unsynchronized concurrent or parallel execution of the contained activities.

The CAG is associated with a completion condition that declares when execution of the CAG is considered complete. An exemplary default completion condition declares execution of the CAG to be complete when all contained activities are in the complete or cancelled state. An exemplary completion condition is a Boolean value that references variables and messages in the scope enclosing the CAG and its parent scopes as well as the state of other activities. If the completion condition evaluates to true when the CAG moves from the latent state to the enabled state, then the CAG immediately completes without enablement or execution of any contained activities. When the completion condition of an executing CAG activity evaluates to true at any time, any and all executing activities contained within the CAG are immediately cancelled and the CAG activity moves to the completed state.

Each activity in the CAG has an associated constraint associated therewith. An exemplary constraint for a constrained activity (e.g., one within the CAG) is a Boolean function that references variables and messages in the scope enclosing the CAG and its parent scopes, but not sibling scopes, as well as the state of other activities within the CAG. A constraint may be either transparent, partially transparent, or opaque depending upon what is known about its data dependencies and implementation. Data dependencies, but not implementation, are known for a partially transparent constraint. For a fully transparent constraint, data dependencies and implementation are known. Opaque constraints do not offer information about either data dependencies or implementation. Transparent and partially transparent constraints have the advantage of more efficient evaluation since the engine may make useful judgments about when the evaluation of such a constraint is required.

An enable constraint on an activity, when it becomes true, declares that the associated activity is ready for execution and must be enabled. This constraint is only meaningful while the activity is in the latent state. Thus, it may only evaluate to true once. A constraint may be disabled at any time after it has been enabled. This supports the XOR condition common in the case where two tasks are assigned to two individuals, the completion of one cancels the other task (disabled). The disable constraint as in the enable constraint is a one-shot. The enable constraint of a CAG may be re-enabled after the CAG's completion condition is satisfied to provide a repeat semantic or a while semantic to the tasks in the CAG.

The completion condition of a CAG activity and all the constraints associated with contained activities may be thought of as a single collection of expressions. When the CAG itself is enabled, all Boolean expressions whose data dependencies are satisfied are evaluated. If the completion condition of the CAG is true, then the CAG is immediately considered complete. Otherwise, a list of zero or more activities to be enabled is generated. The workflow engine of the invention enables the identified activities. As changes occur to the state of the schedule (e.g., to the state of the data universe on which the constraints and completion condition depend) due to activity execution, re-evaluation of constraints occurs and new activities to be enabled are identified. Expression evaluation and activity execution are performed concurrently as opposed to a phased or two step iterative process.

Figure 5:
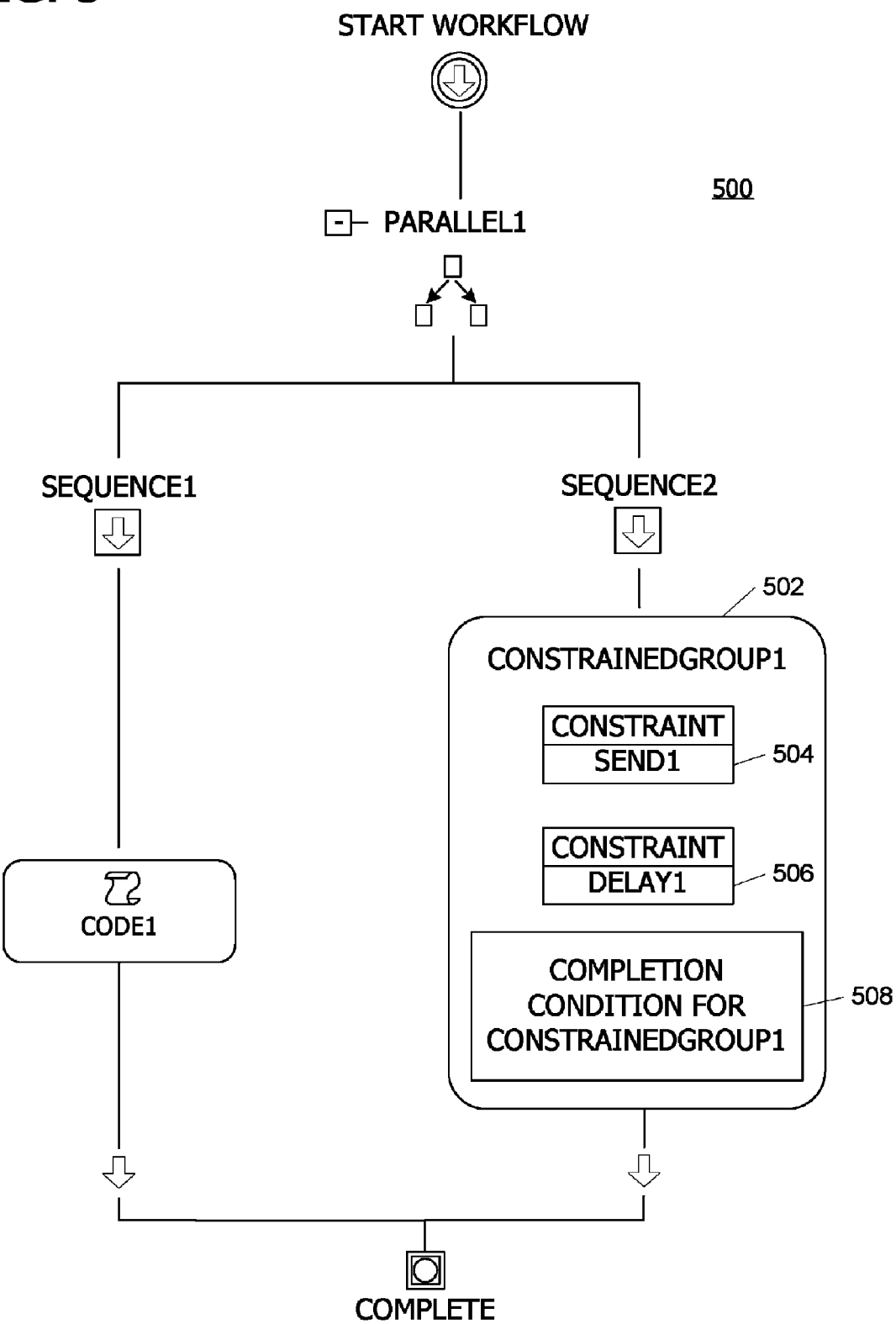
FIG. 5 is a block diagram illustrating a constrained activity group within a flow-based workflow.

Referring next to FIG. 5, a block diagram illustrates a workflow model 500 having a constraint-based region defined within a flow-based region using a CAG. The flow-based region includes a structured set of activities (e.g., workflow model elements). The constraint-based region of the workflow shows a set of activities which are performed when an associated constraint (e.g., a Boolean expression over the data state of the schedule) is true. A flow-based model is complete when its endpoint is reached while the activities within the constraint-based region are executed whenever a constraint associated with one of the activities is satisfied (e.g., indefinitely or until a CAG completion semantic is satisfied). Having a completion semantic for the constraint-based region enables constraint-based regions and flow-based regions to be combined.

In the example of FIG. 5, the constraint-based region includes ConstrainedGroup1 502. The activities within ConstrainedGroup1 include Send1 504 and Delay1 506. Each of the activities 504, 506 have a constraint associated therewith. In addition, a completion condition 508 is associated with ConstrainedGroup1 502.

Workflow Stencils

A workflow stencil (e.g., a workflow template or an activity package) includes a root activity and a set of activities. Stencils may be domain and or host specific. Examples of the former include a structured workflow stencil, human workflow stencil, and an unstructured workflow stencil. Some stencils may be "closed" as a set of activities including one or more roots designed to work together, possibly in a particular host environment. Other stencils may be "open", to varying degrees. A stencil defines its extensibility points. For instance, a developer writes a CustomRoot and a new abstract CustomActivity and declares that the package is CustomRoot plus any activity that derives from CustomActivity.

An exemplary BPEL or XLANG/S stencil includes a root activity with the following characteristics: participates in state management and transactions, has associated event and exception handlers, supports contract first model, may be analyzed, and has well-defined activation and termination behavior. The exemplary stencil further includes a set of messaging specific activities (e.g., Send and Receive and their variants) and other structured activities such as Scope, Loop, Condition, Listen, and Throw.

An exemplary Halifax Stencil includes a root activity with the following characteristics: implicit state management, associated exception handlers (0-n), supports event-based model, has well defined activation behavior, and has undefined termination. The root activity contains 0-n EventDriven activities. Each EventDriven Activity represents a Halifax Action. Each EventDriven Activity has an associated state management protocol and executes in an atomic scope.

Designer Framework (User Interface)

Figure 6:
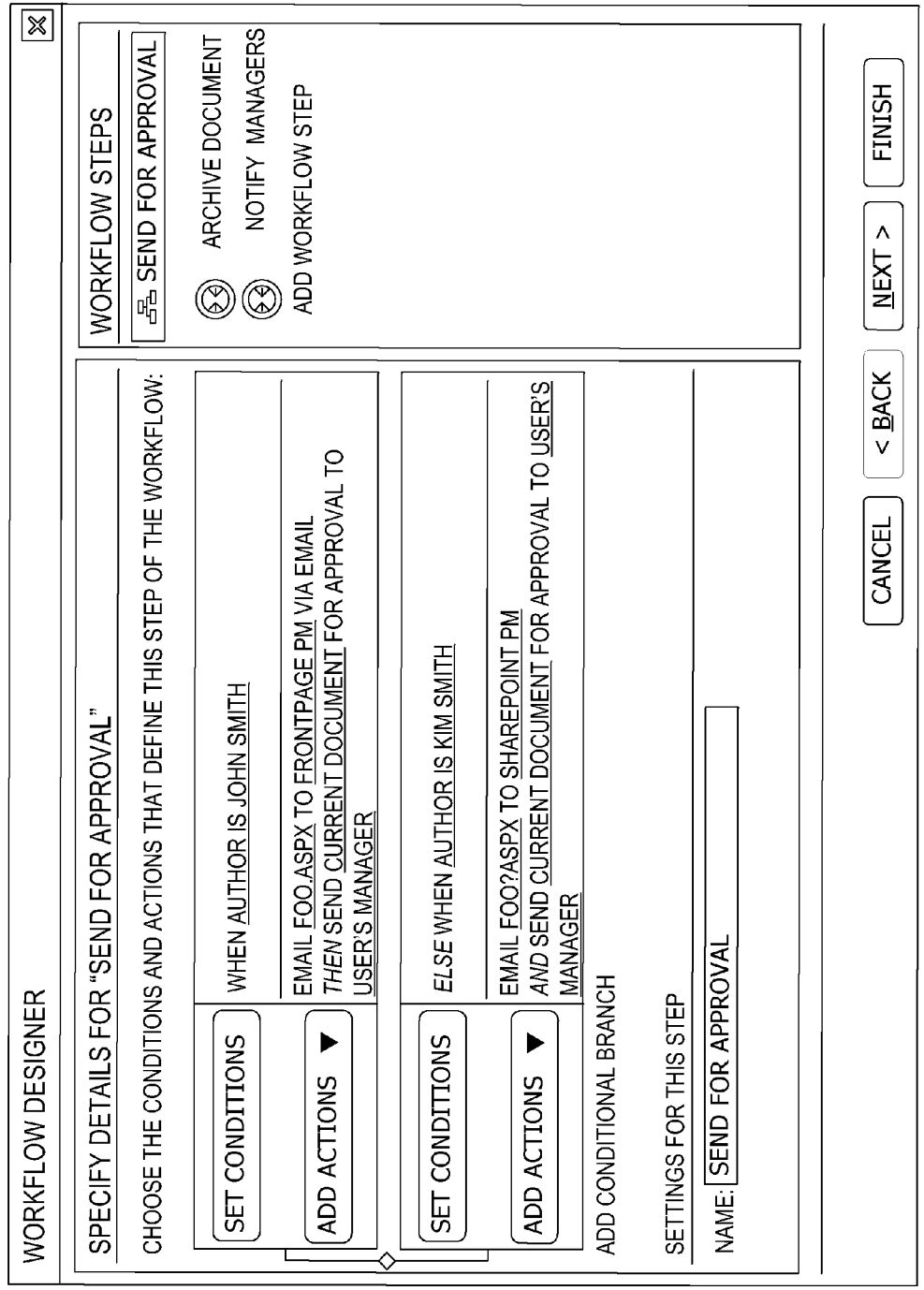
FIG. 6 is a high-level application user interface for authoring workflows that relies upon wizards for specification of the workflow.

The orchestration engine provides a framework for designing various classes of workflow models in a WYSWYG fashion. For example, referring to FIG. 6, a high-level application user interface for authoring workflows relies upon wizards for specification of the workflow. The framework includes a set of services and behaviors that enable developers to write visual workflow designers. These services provide an efficient way of rendering a workflow process, support for Ink/Tablet for drawing the flows, and support for designer operations such as undo/redo, drag/drop, cut/copy/paste, zoom, pan, search/replace, bookmarks, adornments, smart tags for validation errors, valid drop-target indicators for activities, auto layout, view pagination, navigation markers, drag indicators, print and preview with headers/footers, etc. Through such a user interface, simple workflows containing tasks and control flow composite activities (e.g., sequence, parallel, and conditional) may be constructed. No input of code (or reliance upon existing compiled code) is required either for rule specification (e.g., conditional branching logic, while looping logic) or dataflow specification (e.g., the output of task A is input to task B). The serialized representation of a schedule (including rules and dataflow) is self-contained and complete in some scenarios where no code-beside is required.

Figure 7:
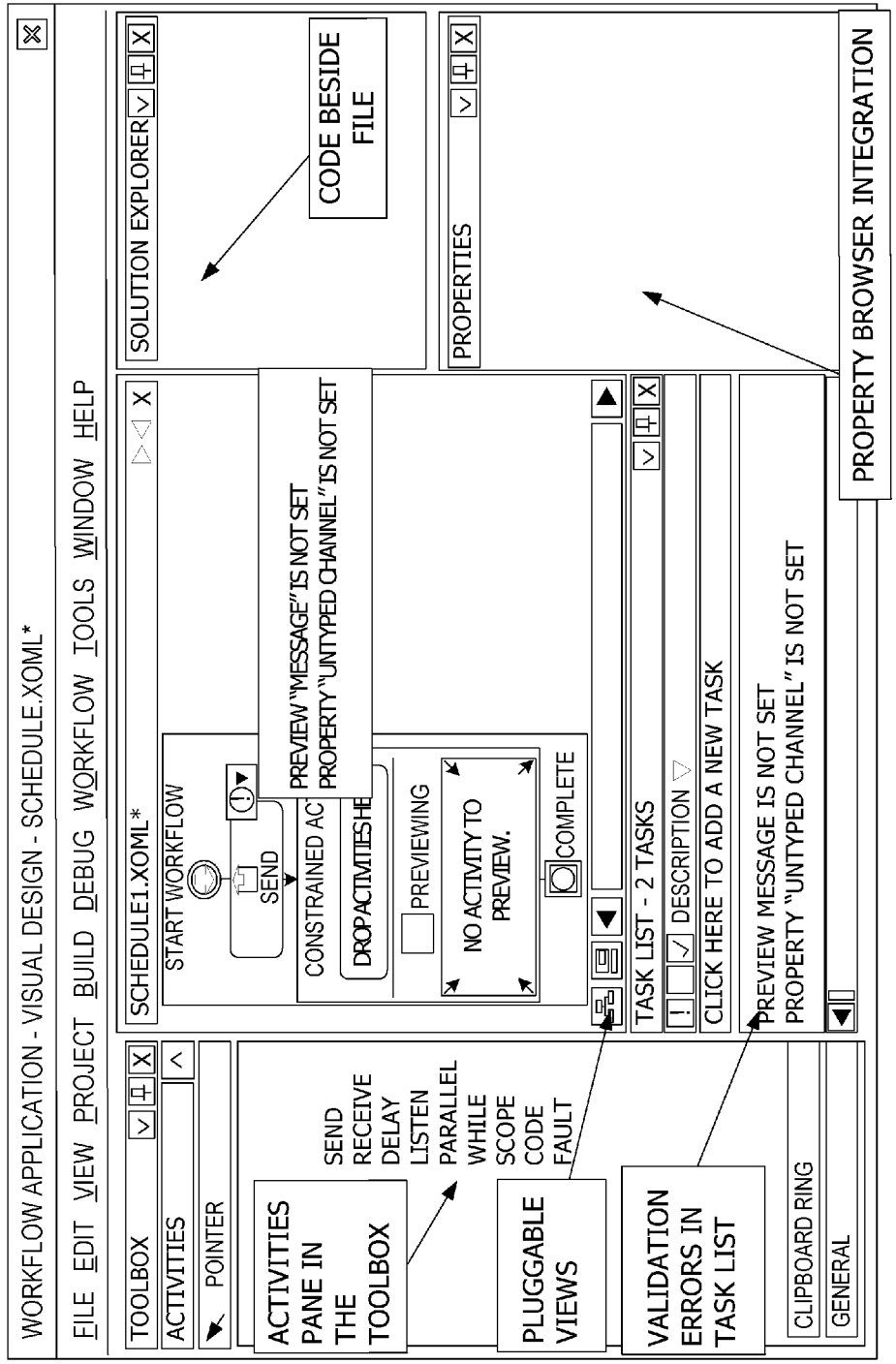
FIG. 7 illustrates an exemplary workflow designer.

Using the designer framework of the invention, the orchestration engine of the invention includes a rapid application development (RAD) style visual workflow designer with support for associating software code with the workflow model in a visual way. Each activity in the workflow has an associated activity designer. Each activity designer is written in terms of framework services. The framework of the invention also contains a visual designer model. The visual designer model includes a set of activity designers linked with one another via relationships described in the workflow model. FIG. 7 illustrates an exemplary workflow designer. The invention includes various modes of associating code with the workflow model including "Code-Beside", "Code-Within" and "Code-Only" which enables round-tripping of the user code to the workflow model in real time. The invention also provides real-time semantic errors while the user is building the workflow.

In one embodiment, the invention presents the user with a package identifying a plurality of activities in the designer framework user interface. The invention further receives from the user a selection and hierarchical organization of the presented activities. The invention serializes the received activities to create a persistent representation of the workflow. The invention further receives from the user software code representing business logic for association with one of the plurality of activities in the workflow. The invention may also receive a user-defined activity having one or more semantics associated therewith. The invention includes a semantic checker or validator for evaluating the semantics for conformance to a predefined interface requirement. If the semantics conform to the predefined interface requirement, the invention presents the user-defined activity as one of the plurality of activities. The invention further compiles the software code to create one or more binary files. For example, the invention compiles the serialized workflow representation and software code into a single assembly containing an executable representation of the workflow. The invention executes the created workflow. In one embodiment, one or more computer-readable media have computer-executable instructions for performing the method.

The orchestration engine designer allows the user to recursively compose higher order schedules by using other created schedule and using them. The inline expansion of schedules allows the user to view the schedule contents inline and cut or copy the contents. To enable the inline expansion of the schedule and to make the schedule read only, a separate design surface and designer host for the inline schedule is created. Further, the composite schedule designer has its own hierarchy. The invoked schedule is loaded and displayed when the designer is expanded by the user. In one embodiment, the designer is collapsed when the activity is dropped or copied on the design surface. A property chains the calling activity designer with the root designer of the hosted schedule. The following functions prevent the adding and removing of activities from the designer.

```
internal static bool AreAllComponentsInWritableContext(ICollection
components)
internal static bool IsContextReadOnly(IServiceProvider serviceProvider)
```

These functions are called by the infrastructure to check if the context in which the activities are being inserted is writable. For the hosted designer these functions return false. In addition, properties are prevented from being modified. Other functions fetch the activity designers from the appropriate components:

```
internal static ServiceDesigner GetSafeRootDesigner(IServiceProvider
serviceProvider)
internal static ICompositeActivityDesigner GetSafeParentDesigner(object
obj)
internal static IActivityDesigner GetSafeDesigner(object obj)
```

In one example, a user creates a schedule and compiles it as activity. On successful compilation, the schedule appears on the toolbox. The user opens or creates the schedule in which use of the compiled schedule is desired. The user drags and drops the compiled schedule from the toolbox. A collapsed schedule designer is shown on the design surface. When the user wants to view the contents of the compiled schedule which was dropped, the user expands the schedule designer to show the contents of the invoked schedule inline in a read only state. The inlining of the called schedule enables the user to view the invoked schedule without switching between different schedule designers. The feature is useful to developers composing higher order schedules by reusing existing schedules.

Support for Customization of the Designer Framework Using Themes/Skins

A workflow designer written using the designer framework may be customized using workflow themes. These may be extensible markup language (XML) files which declaratively describe various aspects of the designer. The workflow designer provides wizard support for partners to extend activities. Exemplary user interface features supported by the workflow designer include, but are not limited to, undo/redo, drag/drop, cut/copy/paste, zoom, pan, search/replace, bookmarks, adornments, smart tags for validation errors, valid drop-target indicators for activities, auto layout, view pagination, navigation markers, drag indicators, print and preview with headers/footers, and document outline integration. The workflow designer supports custom designer themes/skins to enable customizing the look and feel of the designer using XML metadata. The workflow designer supports background compilation. In one example, smart tags and smart actions are provided for validation errors while designing the schedule. The workflow designer may be hosted in any container (e.g., application programs, shells, etc.).

Figure 8:
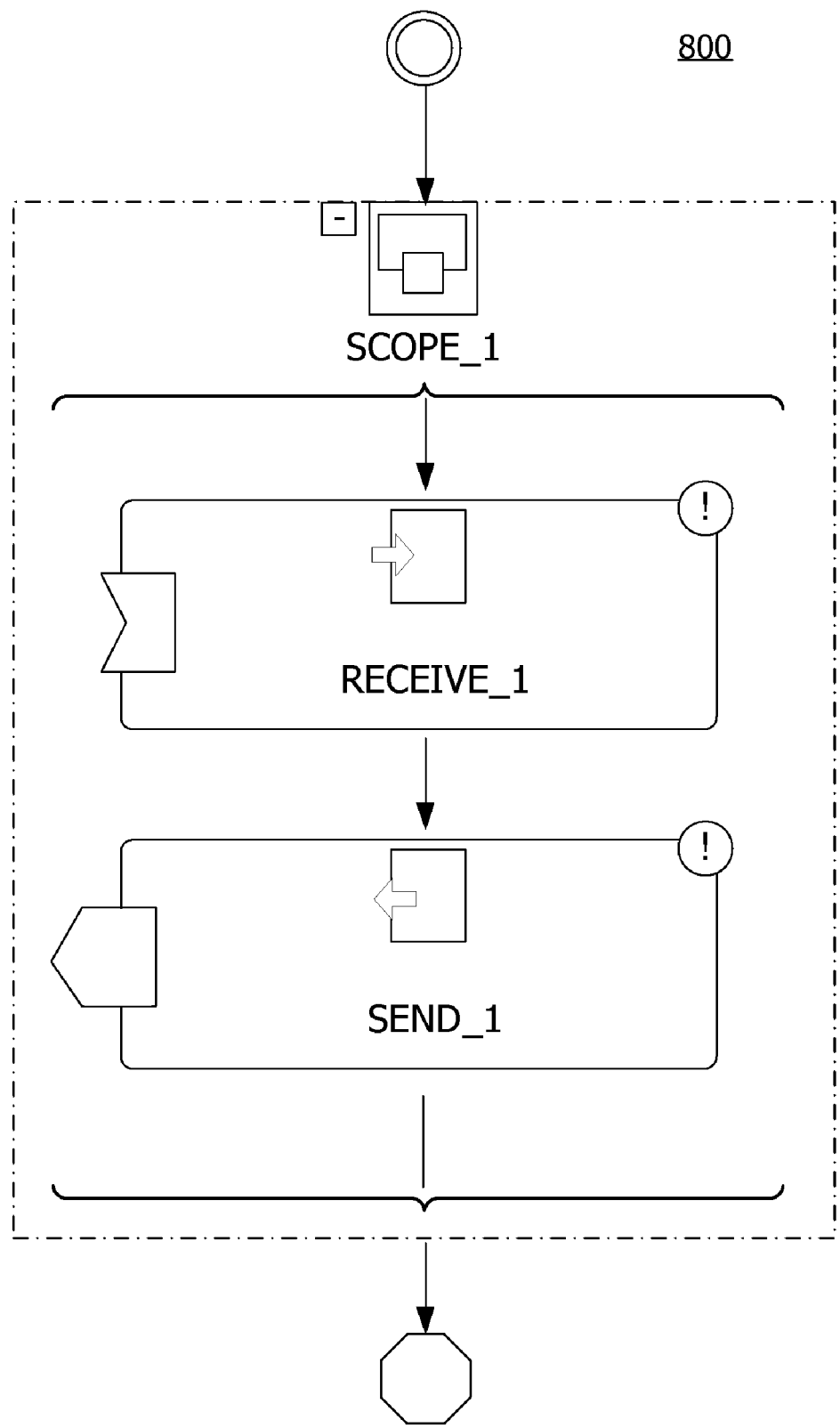
FIG. 8 illustrates an orchestration program including a receive activity followed by a send activity.

An exemplary orchestration engine program includes a receive activity followed by a send activity. The process receives a message and sends it out. The user creates a project called "Hello World" and adds an orchestration item to the project. The user then drags and drops a scope activity onto the design surface. Next, the user drops a receive activity followed by a send activity onto the scope. FIG. 8 illustrates the resultant workflow 800 in the designer. Each activity designer provides a user interface representation on an object model. Developers are able to directly program the object model and set properties on activities or use the designer. The orchestration engine designer allows a developer to select an activity from the toolbox and drag it onto the designer surface. If the activity has already been placed into a schedule and needs to be moved, the developer is able to select it (by clicking on it) and drag it to the area of the schedule where it needs to go. If a developer hold the control key while dragging and dropping, a copy of the selected activities selected are made.

Active placement provides possible drop points (targets) as visual indicators on the design surface. Auto scrolling also participates within the context of drag and drop. When dealing with large schedules, navigation to areas of the designer currently not in the view port are accessible by dragging the activity towards the area of the schedule to be placed.

Drag and drop is supported across schedules in the same project and across schedules in other projects in the same solution. After an activity has been placed onto the design surface, the developer configures the activity. Each activity has a set of properties that a developer configures in order for the schedule to be valid. These properties are editable in the property browser. Every activity controls what properties are viewable in the property browser. To aide the developer in configuring various activities, the designer provides a variety of dialogs or "sub-designers". Each of the dialogs is invoked for various properties of activities.

The orchestration engine is able to customize the activities presented in the toolbox. When a developer creates a custom activity or schedule, the end result is an assembly. Using a dialog, a developer is able to browse to the assembly location and select the assembly to make it appear as an orchestration engine activity. Alternatively, a developer may place the assembly in the orchestration engine installation path and it will be present as an orchestration engine activity.

Application Programming Interfaces (APIs)

In another embodiment, the invention provides application programming interfaces (APIs) for performing various workflow operations. The invention includes a design application programming interface for authoring the workflow. The design application programming interface comprises means for authoring a workflow and means for selecting one or more of the activities to create the workflow. The invention also includes a compilation application programming interface for compiling the workflow authored via the design application programming interface. The compilation application programming interface comprises means for serializing the workflow, means for customizing a visual appearance of the workflow, means for compiling the workflow authored via the design application programming interface, means for validating the workflow.

The invention also includes a type provider application programming interface for associating a type with each of the activities in the workflow. The type provider application programming interface comprises means for associating the type with each of the activities in the workflow and means for associating a type with each of the activities in the workflow.

One or more APIs constitute exemplary means for authoring the workflow, exemplary means for selecting one or more of the activities to create the workflow, exemplary means for serializing the workflow, exemplary means for customizing a visual appearance of the workflow, exemplary means for validating the workflow, exemplary means for compiling the workflow, and exemplary means for associating a type with each of the activities in the workflow.

Activity Execution Framework

With the exception of schedule and scope, the engine views activities as abstract entities and simply coordinates the execution of activities without knowing the specific data or semantics of any particular activity. In one embodiment, four entities interact during the execution of an activity: the activity itself, a parent activity of the activity that is executing, the scope enclosing the activity that is executing, and the orchestration engine. Each entity has a different function.

If the execute method of an activity returns without having signaled completion to its activity coordinator, the activity is said to be in a logical waiting state. Such an activity may be cancelled by the orchestration engine, or continued (e.g., once the item or event on which it is waiting becomes available or occurs, and the activity is notified of this by the engine).

Some activities which never enter the logical waiting state may never be cancelled. Examples include the send activity and the code activity since they execute without any demands on external events or subscriptions. Once handed a thread (i.e. once their execute method is called by the orchestration engine), these activities will do work until done. The orchestration engine is never given an opportunity to cancel them since they do not return the thread until they signal completion.

The orchestration engine runtime uses rules to trigger events on which orchestration engine activities are executed. The orchestration engine designer provides the user ability to associated rules to be evaluated at runtime to trigger events. The orchestration engine designer enables the user to use different types of rules technology by providing extensibility architecture. The designer is agnostic to the type of rules technology used.

In one embodiment, the designer supports Boolean expression handlers as a way to associate a rule with an activity. This means that in the user code file; the user writes a method which returns a true or false value; based on which the rule is triggered. Currently there are multiple technologies which may also be used to evaluate rules including Info Agent and Business Rules Engine (BRE). To achieve this, the designer includes an extensibility architecture which enables the rule technology developers to host custom user interfaces in the designer. The designer provides a way to the custom user interface writers to serialize the rules in the form of code statement collection. The designer emits a Boolean handler in user code file with the code statement collections inserted into it. The orchestration engine includes a default user interface which may also be used by the rule writers. A rule technology provider add rules to the orchestration engine designer by creating a custom rule declaration, writing a user interface type editor associated with the custom rule declaration, creating a custom user interface to host the rules user interface, and generating code statements on save.

In one example, a user selects the activity designer with which rule needs to be attached, locates the rule property in the property browser and selects the "RuleExpressionHandler" in the drop down (which makes the "Statements" property to appear underneath the Rule Property in the user interface), specifies the user code method name in the "Statements" property, invokes a user interface type editor to invoke a dialog which will host rules specific user interface, and defines rules in the dialog by creating new predicate rows and grouping them together. The user interface emits a method in the user code file. The method name will be same as the one specified by the user in the property browser. The code statements equivalent to creating the rule will be inserted in the user code method for rule.

Messaging During Execution

In a running workflow, messages sent to a schedule are intended for a specific schedule instance. For example, an invoice for purchase order #123 must be sent back to the same schedule instance that originated (e.g., sent out) that purchase order. To match an inbound message with the appropriate schedule instance, the message and the schedule instance share a correlation set. The correlation set may be a single-valued correlation set in which means an identifier field in the message is matched against an identifier of the same type that is held by schedule instances. Multi-property correlation sets are also possible and analogous to multi-column primary keys in a database table.

The correlation set value held by a schedule instance is initialized when the schedule instance sends out a message (e.g., the value may be taken from an identifier field of an outbound purchase order) or receives a message. This correlation set value is then a part of that schedule instance's state. When a subsequent inbound message arrives, the correlation set value held in the schedule instance state is matched against the identifier held by an inbound message of the expected type. When a match is found, the correlation set is satisfied and the message is delivered to the schedule instance.

Although the implementation of correlation sets is a function of the orchestration engine and host environment, the user in one embodiment declares the correlation sets to make the schedule instance work correctly. In another embodiment, some activities (e.g., SendRequest/ReceiveResponse activities and ReceiveRequest/SendResponse activities) set up the correlation sets independent of the user. A wide range of validation checks are performed by the send and receive activities to ensure that correlation sets are initialized and followed properly.

Dynamic Editing of Executing Workflows

The orchestration engine provides a framework for authoring (and subsequently visualizing and executing) various types of workflows. Examples include event-condition-action (ECA) style workflows or structured flows or rules driven flows. Further, regardless of the way the workflow was modeled, the framework allows the users to author or edit workflows in the same manner at design time or even when the workflow process is running without the need for recompiling the workflow process. The framework allows the user to roundtrip between the runtime and the design time representation with hi-fidelity. Ad hoc changes are the changes made at run time to the process model. A user may ask a running instance for its schedule model and make changes to the model. For example, the user may add, remove, or replace activities in a batch, then commit or rollback the batched changes. In one embodiment, the model is validated after the updates. In many workflow scenarios of the invention, there is a blurring of, or even an elimination of, the separation between "design-time authoring" and "runtime execution."

A schedule instance effectively shares with other instances the activity type (metadata) tree defined for those instances' schedule type. But any schedule instance, once it begins executing, may be changed on the fly via the addition of new activities or the manipulation of declarative rules. It is possible to take such a modified schedule instance and "save as" as a new schedule type or more generally, to simply recover the serialized representation from the instance. That is, a running schedule instance may be serialized and then brought into any designer (e.g., authoring environment) or runtime visualization tool.

Further, it is possible for an advanced developer to author a schedule entirely as software code. To author a schedule type directly, the developer simply includes a static method called InitializeScheduleModel in the software code in the code-beside class for the schedule and marks this method with a [ScheduleCreator] attribute. In one embodiment, the static method takes no parameters and returns a Schedule object. There is no companion serialized file, though the serialized representation of the schedule may be recovered from the Schedule object that is created. Although this means that a schedule may be developed using a single software code file, validation checks may not be performed on the file. The orchestration engine compilation ensures the structural and semantic validity of the activity tree that underlies the schedule type. In another embodiment, compilation and validation run internally to produce the actual type that is executed, but no code input is required. Schedule type compilation becomes a very light process since there is no translation from a compile-time object model to a runtime object model. In essence, compilation simply combines the object model representation of a schedule with code-beside to produce a new type. In one embodiment, there may be no fundamental need to provide any code-beside at all for a particular schedule if the compiled code-beside matches what is demanded by the activities in the object model or code-beside may already exist in compiled form (an assembly).

When compiling a serialized schedule, it is possible to point to an existing compiled type that effectively serves as the code-beside for the schedule. A derivative of this compiled type is created and this new type serves as the code-beside to ensure that a unique type is created to represent the new schedule.

Serialization Architecture

The serialization infrastructure provides a modular, format neutral and easily extensible mechanism to serialize the orchestration engine activity tree. In particular, a caller (e.g., an application program or a user) requests a serializer for an object (or activity) A from the serialization manager. The metadata attribute of object A's type binds object A to a serializer of the requested type. The caller then asks the serializer to serialize object A. Object A's serializer then serializes object A. For each object encountered while serializing, the serializer requests additional serializers from the serialization manager. The result of the serialization is returned to the caller.

Every activity in the orchestration engine component model may participate in serialization. The serializer component is not a part of activity class itself in one embodiment. Instead the component is specified by annotating a serializer attribute in a class associated with the activity. The serializer attribute points to a class which is used to serialize objects of that activity type. In another embodiment, provider components for an activity type override the default serializer provided by the activity.

Designer serialization is based upon metadata, serializers, and a serialization manager. Metadata attributes are used to relate a type with a serializer. A "bootstrapping" attribute may be used to install an object that provides serializers for types that do not have them. A serializer is an object that knows how to serialize a particular type or a range of types. There is a base class for each data format. For example, there may be an XmlSerializer base class that knows how to convert an object into XML. The invention is a general architecture that is independent of any specific serialization format. The serialization manager is an object that provides an information store for all the various serializers that are used to serialize an object graph. For example, a graph of fifty objects may have fifty different serializers that all generate their own output. The serialization manager may be used by these serializers to communicate with each other when necessary.

In one embodiment, the use of serialization providers coupled with serializers that use generic object metadata provide a callback mechanism where an object is given the opportunity to provide a serializer for a given type. A serialization manager may be given a serialization provider through a method such as AddSerializationProvider. A serialization provider may be automatically added to a serialization manager by adding an attribute such as DefaultSerializationProviderAttribute to the serializer.

In one embodiment, the format is dictated by the following rules: an object is serialized as an xml element, a property of an object is categorized as simple property (e.g., serialized as an xml attribute) or complex property (serialized as child element), and a child object of an object is serialized as child element. The definition of a child object may differ from an object to another object. The example below is the serialization of a while activity, which has a Send activity as one of its child objects.

```
<While ID="while1">
    <ConditionRule>
        <CodeExpressionRuleDeclaration>
            <Expression Name="whileCondition" />
        </CodeExpressionRuleDeclaration>
    </ConditionRule>
    <Send HasTypedChannel="True" ID="send1">
        <MessageName="msg1" Type="System.UInt32" />
        <OnBeforeSend Name="onBeforeSend1" />
        <TypedChannel Type="System.Collections.IList"
            Operation="AddIndex" Name="Foo" />
    </Send>
</While>
```

In an embodiment in which the language used for serialization is XOML, each XOML element is serialized to its respective object when the schedule is compiled. Objects include both simple and complex types. The mapping between the XOML representation of each activity and its mapping to the authoring object model is next described. Serialization of XOML varies between Primitive and Composite activities.

Simple types for primitive activities are serialized as attributes on the activity type. Complex types for primitive activities are serialized as child elements. As an example, here is the XOML representation of a Send activity.

```
<Send ID="send1" HasTypedChannel="False">
    <MessageName="message1" Type="System.String" />
    <UntypedChannel Name="c1" />
</Send>
```

In a similar manner to primitive type serialization, simple types for composite activities are serialized as attributes on the activity type. However, by definition, composite activities encapsulate nested activities. Each nested activity is serialized as another child element. As an example, here is the XOML representation of a While activity.

```
<While ID="while1">
    <ConditionRule>
        <CodeExpressionRule>
            <Expression Name="test" />
        </CodeExpressionRule>
    </ConditionRule>
</While>
```

Figure 9:
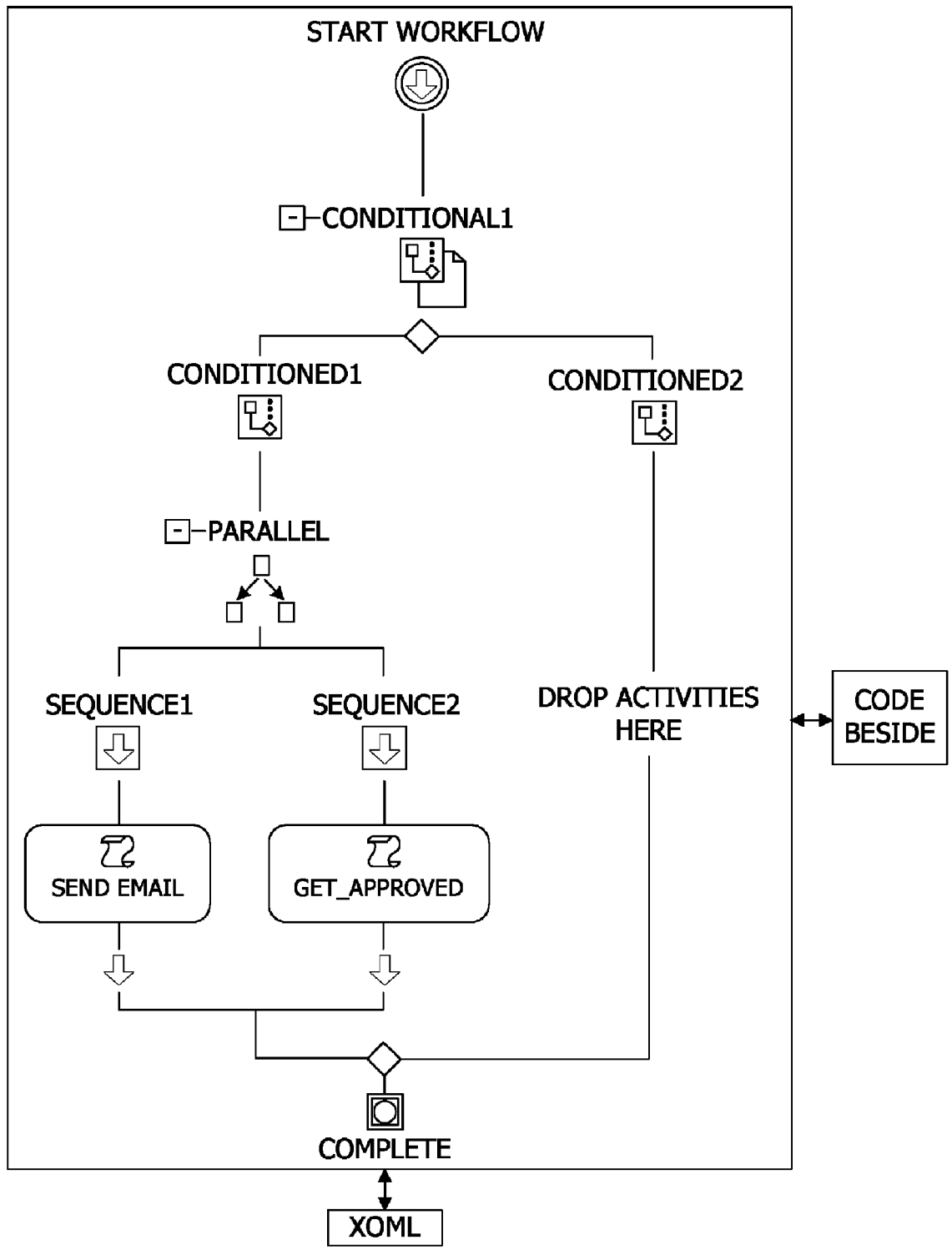
FIG. 9 illustrates a schedule definition and the relationship between a visual workflow, a serialized representation in XOML of the workflow, and the code beside of the workflow.

A strong relationship between the process/workflow view and the serialized representation exists. FIG. 9 illustrates a schedule definition and the relationship between a visual workflow, a serialized (e.g., XOML) representation of the workflow, and the code beside of the workflow. When authoring in either representation, the other will incur changes. Thus, modifying the XOML for an activity (or its constituent parts in cases of composite activities) is directly reflected in the process/workflow view when a developer switches between the two. The converse is also applicable. Modifying the activity in the process/workflow view results in the appropriate modification within XOML. As an example, the deletion of an activity in the process/workflow view results in the removal of the XML element in XOML for the same activity. Round tripping also occurs between the process/workflow view and the code beside.

During creation of the XOML code, if the XOML definition does not conform to a pre-defined interface requirement, the offending XML element is underscored or otherwise visually identified to the developer. If the developer switches to the process view, they will be alerted that there is an error within the XOML and the designer provide a link where the developer may click and will be navigated to the offending element. This same error appears in the task pane and upon doubling clicking on the error, the developer will be navigated to the offending element in the XOML.

Creating the Activity Tree from a XOML File (Deserialization)

In one embodiment, a CreateEditorinstance( ) function creates a DesignSurface object and then calls a BeginLoad( ) function onto the DesignSurface object passing the actual loader object into it, which eventually ends up in a BeginLoad( ) call to a DesignerLoader( ) function. A PerformLoad( ) function reads the text buffer object and deserializes it to the orchestration engine component model hierarchy. The invention walks through the hierarchy and inserts the activities into the design surface to load the components in the visual studio.

The invention also listens to changes to the XOML file to track the hierarchy and item identification changes to update the values in the visual studio cache. A secondary document data list includes a list of secondary documents, invisible to the user, on which orchestration engine designer works. For example, it is possible that user has not opened the code beside file, but when the user makes changes in the orchestration engine designer, the changes are made to the code beside file. As this file is not visible to the user, the file is maintained as a secondary document. Whenever the XOML file is saved, the secondary documents are automatically saved. If the name of one of these files changes or if the file is deleted, the invention updates the corresponding secondary document objects accordingly.

Exemplary deserialization guidelines for an object tree are as follows. An xml element is first treated as a property of parent object. If the parent object does not have a property with the element's tag name then the element is treated as a child object of the parent object. An xml attribute is treated as simple property on the parent object.

In an exemplary deserialization using the serialized code above, a <While> element is treated as an object created using the xml namespace information. A <ConditionRule> element is treated as a property of the While activity. The <CodeExpressionRuleDeclaration> element is treated an as object whose value will be applied to the ConditionRule property. The <Send> element is first tried as a property of the While activity, but the 'While' activity does not have a property with the name 'Send', so the <Send> element is treated as an object and added as the children activity of the while activity. The <Message> element is treated as a property of the Send activity. Because the Message property on Send is read only, the contents of Message element are considered as the contents of Message object. A similar rule applies to the deserialization of <OnBeforeSend> and <TypedChannel> elements.

Under the following conditions, XOML de-serialization will critically fail: the XOML code is not well formed, the XomlDocument is not the first element in the XOML code, and the first activity in the XOML code cannot be de-serialized. The developer will be presented with error message with which they may navigate to the offending XML element when switching from XOML view to process/workflow view.

Hosting the Orchestration Engine Designer

The designer framework may be hosted in any application program. This is a very useful feature for third party applications to render workflow in their respective environments. It also will allow third parties to develop tools around the orchestration engine designer by rehosting and customizing the design surface. The framework of the invention expects the hosting container application to provide a set of services such as editors and/or text buffers.

One step in rehosting the designer is to create a loader and a design surface. The loader is responsible for loading a XOML file and constructing the designer host infrastructure which maintains the activities. The design surface maintains the designer host infrastructure within it and provides services to host and interact with the design surface. The design surface acts as a service container as well as a service provider. In one example, the following code is executed to load a XOML document and construct a designer host which maintains the activities in it.

```
this.loader.XomlFile = filePath;
if (this.surface.IsLoaded == false)
    this.surface.BeginLoad(this.loader);
```

The following services enable different functions in the designer. An ISelectionService function maintains the selected objects. An IToolboxService function manages interaction with the toolbox. An IMenuCommandService function manages interaction with the menu. An ITypeProvider function enables the type system. In addition, there may be additional services provided by the designer hosting environment to enable advanced designer features.

The type system is a component in the component model framework of the invention. When a designer is hosted inside a project system, a TypeProvider object is created on a per project basis. Assembly references in the project are pushed to the type provider. Further, the user code files in the project are parsed and a single code compile unit is created and pushed to the type provider. Also, the invention listens to the events in the project system which may cause the types to be changed in the type system and makes appropriate calls to the type provider to re-load types in response to the changes.

Undo/Redo

After creating and correctly constructing a schedule, a developer may wish to roll-back a series of performed operations. Undo and redo functions of the invention provide visual feedback illustrating which activity has been directly affected. For example, when a property change on an activity is undone, the activity which was affected becomes selected. When the deletion of multiple objects is undone, all the objects involved become selected when they are restored to the schedule. Undo/Redo is a common feature used throughout many applications in other fields and its meaning is well understood. In the orchestration engine designer, undo/redo items are not purged on Save. Further, undo/redo may be performed in the process/workflow view, XOML view, when a developer switches between views, and in the code beside.

Undo/Redo is provided for the following actions in the process/workflow view: activity drag and drop (e.g., dragging an activity from the toolbox to the design surface, moving an activity from one part of the schedule to another, and moving an activity from one designer to another), configuration of an activity (e.g., specifying properties for an activity), and cut/copy/paste/delete.

In one embodiment, the serialized view (e.g., XOML view) is an XML editor which provides the standard undo/redo operations of a text editor. The designer of the invention provides feedback to the developer indicating that changes made in the process/workflow view and then undone in serialized view will result in the loss of serialized code. When the developer constructs a portion of the schedule in the process/workflow view, switches to the serialized view and then decides to perform a undo/redo operation, a warning will appear.

Exemplary Operating Environment

Figure 10:
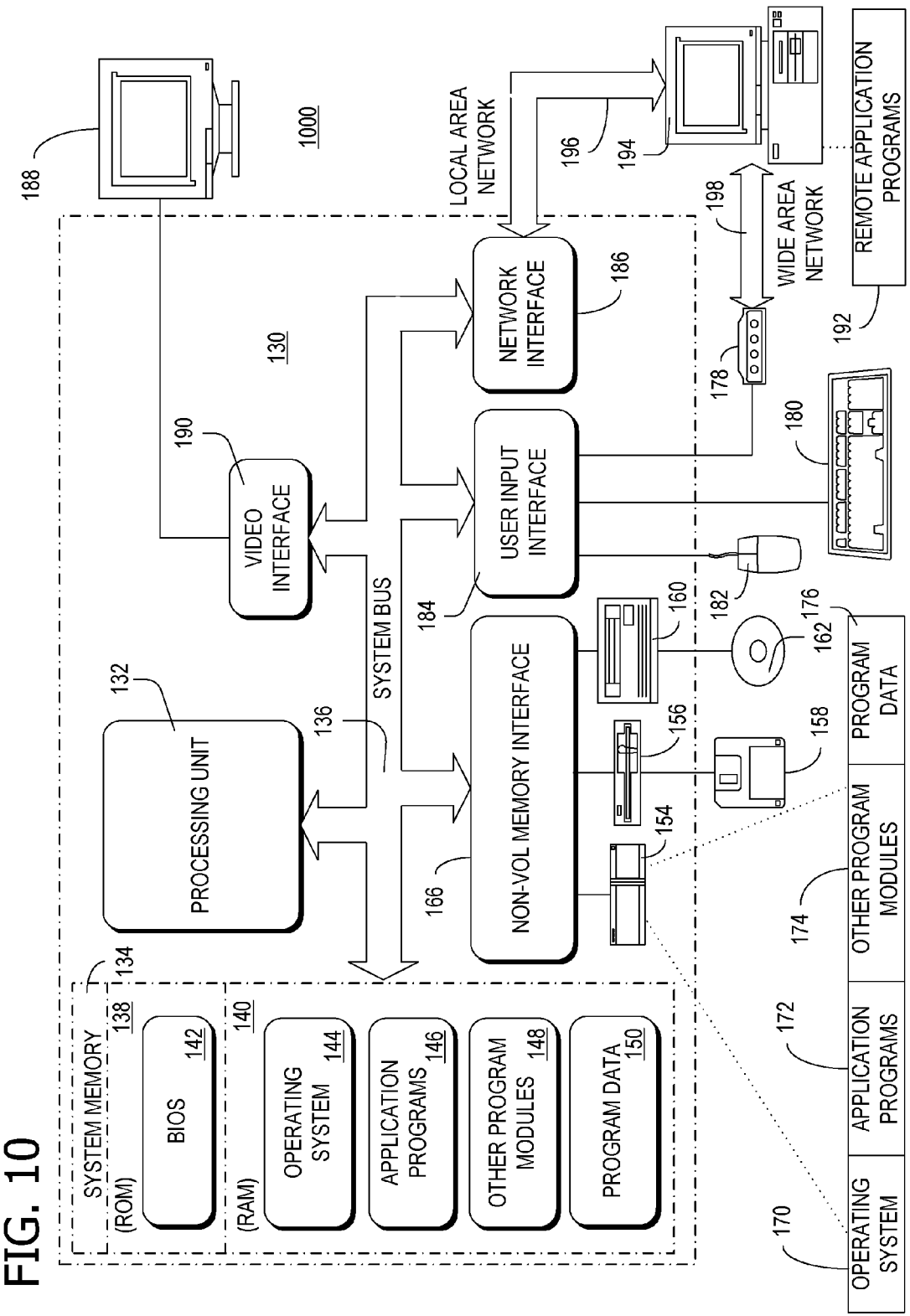
FIG. 10 is a block diagram illustrating one example of a suitable computing system environment in which the invention may be implemented.

FIG. 10 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media.

Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 10 illustrates operating system 144, application programs 146, other program modules 148, and program data 150.

The computer 130 may also include other removable/non-removable, volatile/nonvolatile computer storage media. For example, FIG. 10 illustrates a hard disk drive 154 that reads from or writes to non-removable, nonvolatile magnetic media. FIG. 10 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 10, provide storage of computer readable instructions, data structures, program modules and other data for the computer 130. In FIG. 10, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 10 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 10 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

APPENDIX A

Exemplary Activities and Exemplary Implementation Thereof

Exemplary activities include the following: Send, SendRequest, SendResponse, Receive, ReceiveRequest, ReceiveResponse, Code, Delay, Fault, Suspend, Terminate, InvokeSchedule, InvokeSchedules, InvokeWebService, DotNetEventSource, DotNetEventSink, Sequence, Parallel, While, ConditionalBranch, Conditional, Constrained, ConstrainedActivityGroup (CAG), EventDriven, Listen, EventHandlers, ExceptionHandler, ExceptionHandlers, Compensate, CompensationHandler, Scope, and Schedule.

Each of the exemplary activities have metadata associated therewith. The metadata is transferred to a declarative representation of the workflow by the serializer associated with the activity. For example, the metadata may include an optional code-beside method and an optional collection of correlation sets.

Send Activities

The orchestration engine provides three activities (e.g., Send, SendRequest, and SendResponse) for sending messages, each of which addresses a different use case. Additionally, because the three activities share some metadata, an abstract base class is defined and used as the superclass of all three.

Receive Activities

The orchestration engine provides three activities (e.g., Receive, ReceiveRequest, and ReceiveResponse) for receiving messages, each of which addresses a different use case. Additionally, because the three activities share some metadata, an abstract base class is defined and used as the superclass of all three.

Code

The Code activity executes the code-beside method indicated in the metadata.

Delay

The Delay activity executes its mandatory code-beside method to generate a DateTime value. It internally sets the TimeoutValue property on its instance data to this value. If the DateTime is in the past, the Delay completes immediately. Otherwise, it sets up a timer subscription so that the Delay will be notified when the timer fires. When the timer fires, the Delay is notified and it completes.

Fault

The Fault activity executes its mandatory code-beside method to generate a Exception object. It then throws this exception.

Suspend

The Suspend activity suspends the current schedule instance.

Terminate

The Terminate activity terminates the current schedule instance.

Invoke Schedule

The InvokeSchedule activity invokes a schedule.

Invoke Web Service

Invokes a web service via a proxy class, passing and receiving parameters as specified.

DotNetEvent Sink

Blocks awaiting notification that the specified event has been raised by a previously invoked schedule instance.

DotNetEvent Source

Raises the specified event, and immediately completes execution.

Sequence

The Sequence activity coordinates the execution of a set of child activities in an ordered fashion, one at a time.

Parallel

The Parallel activity executes a set of child activities concurrently.

While

Iteratively executes the child activity.

ConditionalBranch

Executes the child activities, per Sequence semantics.

Conditional

A Conditional activity contains an ordered set of ConditionalBranch activities.

Constrained

Wrap an activity for the purpose of adding it to a constrained activity group (CAG).

Metadata:
  An enable rule for the wrapped activity.
  A disable rule for the wrapped activity.
Runtime Properties:
  Integer indicating whether the wrapped activity has completed at least once.
Execution:
  The only allowed parent of a Constrained activity is a CAG. The CAG itself utilizes the enable and disable rules on a Constrained activity to determine when to execute it. When the Constrained activity is told by the CAG to execute, it simply executes the activity that it wraps.
  The Performed property is incremented when the Constrained activity completes its execution. It is reset to zero only when the parent CAG itself is re-executed (e.g. within a WhileLoop or a second, outer, CAG).
CAG (Constrained Activity Group)
  Provide constraint-based execution of a set of child constrained activities.
Metadata:
  A completion rule.
Execution:
  CAG contains only constrained activities. When the CAG executes, it executes (and re-executes) child activities based upon the evaluation of their enable and disable constraints. A child activity is executed by the CAG only when its enable rule evaluates to true and its disable rule evaluates to false. In one embodiment, CAG walks its sub-tree and subscribes to activity state changes for all activities (this will stop at call boundaries). CAG adds a subscription whenever an activity is added dynamically to its sub-tree. CAG subscribes to data changes for its enclosing scope and all parent scopes up to a schedule boundary. These subscriptions are determined by analysis of the enable and disable rules on all constrained activities in the CAG. The engine delivers batched notifications of data changes and the CAG decides which rules to evaluate. Note that data changes made by a called schedule are posted when the call completes. The invention further identifies scope variable dependencies even if those variables are accessed indirectly via code beside methods. As such, it is possible to be very specific in determining which constraints should be reevaluated when a variable is changed. This same mechanism works for both declarative and code rules. If a constrained activity has no enable rule, it is taken to always be true. If a constrained activity has no disable rule, it is taken to always be Performed>0. Thus, if no rules are specified on a constrained activity, it is executed immediately when the CAG executes, and it does not ever get re-executed. Likewise, if only a custom enable rule is provided on a constrained activity, it is executed when that enable rule evaluates to true and it only executes that one time. If constraint-based re-execution is desired, an appropriate custom disable rule should be provided along with the appropriate enable rule. The following table illustrates the condition required to execute a Constrained activity.

TABLE A1

Constrained Activity Execution.

| EnableRule | DisableRule | Can activity execute? |
|---|---|---|
| TRUE | FALSE | Yes |
| TRUE | TRUE | No |
| FALSE | FALSE | No |
| FALSE | TRUE | No |

If during the execution of an activity, the disable rule for that activity evaluates to true, the CAG cancels the execution of that activity. This does not preclude re-execution of that activity. As soon as the completion rule of the CAG evaluates to true, the CAG immediately cancels any currently executing child activities, and then itself completes. Rules (e.g., enable, disable, and completion) are evaluated whenever necessary based upon their data and state change dependencies.

The CAG provides two operation modes: Preview & Edit. If the CAG designer is in preview mode, the developer is only able to select the activity which appears the filmstrip. The property browser exposes enable and disable rule options when a developer has selected any activity. This allows a developer to set enable and disable rules for each activity with a CAG. If the CAG designer is in design mode, the developer is able to click on the activity in the preview window (called a Constrained). The property browser displays the enable and disable rule options (e.g. similar to preview mode) in addition to the properties normally exposed by the specific activity. The CAG designer provides the additional context menu options shown below.

Preview Activity: Given a selected activity, the CAG switches from design mode to preview mode.
  Edit Activity Given a selected activity, the CAG switches from preview mode to design mode.
  View Previous Activity: Move to the activity immediately preceding the currently selected activity in the filmstrip. When you reach the first activity in the CAG filmstrip, this menu option is disabled.
  View Next Activity: Move to the activity immediately following the currently selected activity in the filmstrip. When you reach the last activity in the CAG filmstrip, this menu option is disabled.

In one embodiment, each activity within a CAG is wrapped within a 'constrained activity.' This is then exposed to the developer via the filmstrip of the CAG. If the CAG is in preview mode and a developer selects this activity and copies it, the only place where it may be pasted (and thus have the consequential context menu enabled) in one embodiment is within another CAG. However, if the developer switches the CAG mode to "Design" and chooses the activity within the preview pane, copy, paste, and drag-drop are enabled in a similar manner as with the other activities.

Task
  Model an external unit of work that is performed by one or more principals.
Event Driven
  Wrap an activity whose execution is triggered by an "event" activity.
Listen
  Conditionally execute one of n child EventDriven activities.
Event Handlers
  The EventHandlers activity simply holds a set of EventDriven activities, for use by the associated Scope.
Exception Handler
  Wraps an activity with metadata that represents a catch block for a scope.
Exception Handlers
  Wrap an ordered set of ExceptionHandler activities.
Compensate
  Compensate a completed child scope.
Compensation Handler
  Wrap a child activity that is defined as the compensation handler for a scope.

Scope

A scope is: a transaction boundary; an exception handling boundary; a compensation boundary; an event handling boundary; and, a boundary for message, variable, correlation set, and channel declarations (i.e. shared data state). Execution of the activities within a Scope is sequential, and thus the contained activities are explicitly ordered when the scope is constructed, as in a Sequence.

Schedule

A Schedule is the only top-level activity that the orchestration engine will execute.

Composite Activities

The composite activity types that enable control flow are: Sequence, Parallel, Constrained Activity Group, Conditional, While, Listen. Additionally, Scope and Schedule are composite activity types that act as containers with implied sequencing of the activities within them.

What is claimed is:

1. A computer-implemented method for modeling a workflow, said workflow representing a business process, said method comprising:

presenting a plurality of activities to a user;

receiving from the user a first selection of the activities and a flow specification associated therewith;

grouping, by a computer, the received first selection of activities;

receiving, by the computer, from the user another selection of the activities and a constraint associated with each of the activities from the other selection, said constraint including a function that enables the activity associated therewith for execution when the constraint is satisfied, said activities from the received first selection being different from the activities from the other selection; and generating, by the computer, a constrained activity group (CAG) including one or more of the activities from the other selection, said CAG defining at least one of the following conditions for the one or more of the activities from the other selection in the CAG: the constraint can be disabled at any time after the constraint has been enabled; when an enabled constraint becomes true, the enabled constraint declares that the activity associated therewith is ready for execution and must be enabled; when a completion condition of an executing activity is evaluated to be true at any time, any and all executing activities contained within the CAG are immediately canceled;

merging, by the computer, the received other selection of the activities with the grouped selection of activities to create a workflow;

executing, by the computer, the activities from the first selection in the merged workflow;

during executing the activities from the first selection, determining, by the computer, a change in the constraint for each of the activities from the other selection in the merged workflow, said change resulting from changes to data in the function included in the constraint; and enabling, by the computer, the execution of each of the activities from the other selection in the CAG when the constraint associated therewith is satisfied as a function of the determined change, wherein a course of execution of the merged workflow is guided by the constraints associated with the activities from the other selection of the user contained within the CAG.

2. The method of claim 1, wherein grouping the received first selection of activities occurs in accordance with the received flow specification, said received first selection of activities being well-defined control flow activities that are processed based on the flow specification and that are complete when an endpoint for the activities is reached.

3. The method of claim 1, wherein each of the activities from the other selection is an activity that is executed not based on the flow specification, is executed in any order, and is executed whenever the constraint associated with an activity from the other selection is satisfied.

4. The method of claim 1, wherein executing the activities from the first selection in the merged workflow occurs according to the flow specification.

5. The method of claim 1, further comprising defining the constraint.

6. The method of claim 1, further comprising executing the created workflow by:

evaluating the constraint; and executing the activities from the other selection as a function of said evaluating.

7. The method of claim 1, further comprising executing the created workflow by executing the activities with the received selection of activities in accordance with the flow specification.

8. The method of claim 1, wherein presenting the plurality of activities to the user comprises displaying the plurality of activities on a display.

9. A system comprising a plurality of computer executable components tangibly embodied on computer-readable storage media that, when executed by a computer, model a workflow having a flow-based region and a constraint-based region, said system comprising:

a display component for presenting a plurality of activities to a user;

an interface component for receiving from the user a first selection of the activities, said interface component further receiving from the user another selection of the activities and a constraint associated with each of the activities from the other selection, said constraint for each of the activities associated therewith from the other selection including a function that enables the activities for execution when the constraint is satisfied, said activities of the received first selection being different from the activities of the other selection; and a designer component for grouping the received selection of activities in accordance with the received flow specification, said designer component generating a constrained activity group (CAG) including one or more of the activities from the other selection, said CAG defining at least one of the following conditions for the one or more of the activities from the other selection in the CAG: the constraint can be disabled at any time after the constraint has been enabled; when an enabled constraint becomes true, the enabled constraint declares that the activity associated therewith is ready for execution and must be enabled; when a completion condition of an executing activity is evaluated to be true at any time, any and all executing activities contained within the CAG are immediately canceled, said designer component further merging the received other selection of the activities with the grouped selection of activities to create a workflow;

wherein the designer component determines a change in the constraint in each of the activities from the other selection in the merged workflow during executing the activities from the first selection, said change resulting from changes to data in the function included in the constraint; and wherein the designer component enables the execution of each of the activities from the other selection in the CAG when the constraint associated therewith is satisfied as a function of the determined change, wherein a course of execution of the merged workflow is guided by the constraints associated with the activities from the other selection of the user contained within the CAG.

10. The system of claim 9, wherein the interface component has a flow specification associated therewith.

11. The system of claim 9, said received first selection of activities being well-defined control flow activities that are processed based on the flow specification and that are complete when an endpoint for the activities is reached.

12. The system of claim 9, wherein each of the activities from the other selection is an activity that is executed not based on the flow specification, is executed in any order, and is executed whenever the constraint associated with each of the activities from the other selection is satisfied.

13. The system of claim 9, wherein the designer component presents the activities from the first selection in the merged workflow according to the flow specification.

14. The system of claim 9, further comprising a runtime component for executing the created workflow by:
  evaluating the constraint; and
  executing the activities from the other selection of the activities as a function of said evaluating.

15. The system of claim 9, further comprising a runtime component for executing the created workflow by executing the activities from the received selection of activities in accordance with the flow specification.

16. The system of claim 9, wherein the display component, interface component, and the designer component execute within an execution environment of an application program.

17. The system of claim 9, wherein the constraint comprises a completion semantic.

* * * * *